United States Patent
Huang et al.

(10) Patent No.: US 11,533,720 B2
(45) Date of Patent: *Dec. 20, 2022

(54) METHOD AND APPARATUS FOR APPLYING SLOT FORMAT INDICATION (SFI) TO A CELL IN UNLICENSED SPECTRUM IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,935

(22) Filed: Jan. 29, 2021

(65) Prior Publication Data

US 2021/0153197 A1    May 20, 2021

Related U.S. Application Data

(63) Continuation of application No. 16/527,689, filed on Jul. 31, 2019, now Pat. No. 10,945,264.

(60) Provisional application No. 62/717,241, filed on Aug. 10, 2018.

(51) Int. Cl.
*H04W 72/04* (2009.01)
*H04L 27/26* (2006.01)

(52) U.S. Cl.
CPC ..... *H04W 72/0446* (2013.01); *H04L 27/2601* (2013.01)

(58) Field of Classification Search
CPC ............ H04W 72/0446; H04W 72/042; H04L 27/2601; H04L 5/0092; H04L 27/2607; H04L 27/2602
See application file for complete search history.

(56) References Cited

U.S. PATENT DOCUMENTS

| | | | | |
|---|---|---|---|---|
| 10,945,264 B2* | 3/2021 | Huang | ................ | H04L 27/2601 |
| 2019/0335456 A1* | 10/2019 | Yerramalli | ........ | H04W 72/1268 |
| 2019/0363773 A1* | 11/2019 | Yerramalli | ............ | H04W 16/14 |
| 2020/0037354 A1* | 1/2020 | Li | ..................... | H04W 74/0808 |
| 2020/0052865 A1* | 2/2020 | Liou | ..................... | H04W 24/08 |

OTHER PUBLICATIONS

3GPP TSG RAN WG1 Meeting #93 , R1-1807034, Busan, Korea, May 21-25, 2018.
3GPP TSG RAN WG1 Meeting #92bis, R1-1804829,Sanya, China, April 16-20, 2018.
3GPP TSG RAN WG1 Meeting #92bis R1-1803678, Sanya, China, April 16-20, 2018.

* cited by examiner

*Primary Examiner* — Afshawn M Towfighi
(74) *Attorney, Agent, or Firm* — Cooper Legal Group LLC

(57) ABSTRACT

A method and apparatus are disclosed. In an example from the perspective of a User Equipment (UE), a Slot Format Indication (SFI) is received within a first Channel Occupancy Time (COT) of a serving cell. The SFI is indicative of one or more slot formats of one or more slots of the serving cell. A first signal indicative of an ending position of the first COT is received. A beginning of at least one slot of the one or more slots is after the ending position. The UE determines whether to apply a slot format, of a slot of the one or more slots, to the slot based upon whether the slot is within the first COT, wherein the slot format of the slot is indicated by the SFI.

20 Claims, 15 Drawing Sheets

500

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | D | F | F | U | U |

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on *tdd-UL-DL-ConfigurationCommon*, *tdd-UL-DL-ConfigurationCommon2*, or *tdd-UL-DL-ConfigDedicated* and/or on detected DCI formats | | | | | | | | | | | | | |

| $\mu$ | $\Delta f = 2^\mu \cdot 15 \,[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

```
-- ASN1START
-- TAG-TDD-UL-DL-CONFIG-START

TDD-UL-DL-ConfigCommon ::=         SEQUENCE {
    referenceSubcarrierSpacing     SubcarrierSpacing,
    pattern1                       TDD-UL-DL-Pattern,
    pattern2                       TDD-UL-DL-
Pattern                                                    OPTIONAL, -- Need R
    ...
}

TDD-UL-DL-Pattern ::=              SEQUENCE {
    dl-UL-TransmissionPeriodicity  ENUMERATED {ms0p5, ms0p625, ms1, ms1p25, ms2, ms2p5, ms5,
ms10},
    nrofDownlinkSlots              INTEGER (0..maxNrofSlots),
    nrofDownlinkSymbols            INTEGER (0..maxNrofSymbols-1),
    nrofUplinkSlots                INTEGER (0..maxNrofSlots),
    nrofUplinkSymbols              INTEGER (0..maxNrofSymbols-1),
    ...
}

TDD-UL-DL-ConfigDedicated ::=      SEQUENCE {
    slotSpecificConfigurationsToAddModList    SEQUENCE (SIZE (1..maxNrofSlots)) OF TDD-UL-DL-
SlotConfig                 OPTIONAL, -- Need N
    slotSpecificConfigurationsToreleaseList   SEQUENCE (SIZE (1..maxNrofSlots)) OF TDD-UL-DL-
SlotIndex                  OPTIONAL, -- Need N
    ...
}

TDD-UL-DL-SlotConfig ::=           SEQUENCE {
    slotIndex                      TDD-UL-DL-SlotIndex,
    symbols                        CHOICE {
        allDownlink                    NULL,
        allUplink                      NULL,
        explicit                       SEQUENCE {
            nrofDownlinkSymbols            INTEGER (1..maxNrofSymbols-
1)                         OPTIONAL, -- Need S
            nrofUplinkSymbols              INTEGER (1..maxNrofSymbols-
1)                         OPTIONAL  -- Need S
        }
    }
}

TDD-UL-DL-SlotIndex ::=            INTEGER (0..maxNrofSlots-1)

-- TAG-TDD-UL-DL-CONFIG-STOP
-- ASN1STOP
```

```
-- ASN1START
-- TAG-SLOTFORMATCOMBINATIONSPERCELL-START

SlotFormatCombinationsPerCell ::=   SEQUENCE {
    servingCellId                       ServCellIndex,
    subcarrierSpacing                   SubcarrierSpacing,
    subcarrierSpacing2                  SubcarrierSpacing
                        OPTIONAL,   -- Need R
    slotFormatCombinations              SEQUENCE (SIZE (1..maxNrofSlotFormatCombinationsPerSet)) OF
SlotFormatCombination   OPTIONAL,
    positionInDCI                       INTEGER(0..maxSFI-DCI-PayloadSize-
1)                                          OPTIONAL,
    ...
}

SlotFormatCombination ::=           SEQUENCE {
    slotFormatCombinationId             SlotFormatCombinationId,
    slotFormats                         SEQUENCE (SIZE (1..maxNrofSlotFormatsPerCombination)) OF
INTEGER (0..255)
}

SlotFormatCombinationId ::=         INTEGER (0..maxNrofSlotFormatCombinationsPerSet-1)

-- TAG-SLOTFORMATCOMBINATIONSPERCELL-STOP
-- ASN1STOP
```

```
-- ASN1START
-- TAG-SLOTFORMATINDICATOR-START

SlotFormatIndicator ::=      SEQUENCE {
    sfi-RNTI                    RNTI-Value,
    dci-PayloadSize             INTEGER (1..maxSFI-DCI-PayloadSize),
    slotFormatCombToAddModList  SEQUENCE (SIZE(1..maxNrofAggregatedCellsPerCellGroup)) OF
SlotFormatCombinationsPerCell   OPTIONAL,   -- Need N
    slotFormatCombToReleaseList SEQUENCE (SIZE(1..maxNrofAggregatedCellsPerCellGroup)) OF
ServCellIndex                   OPTIONAL,   -- Need N
    ...
}

-- TAG-SLOTFORMATINDICATOR-STOP
-- ASN1STOP
```

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 8B

METHOD AND APPARATUS FOR APPLYING SLOT FORMAT INDICATION (SFI) TO A CELL IN UNLICENSED SPECTRUM IN A WIRELESS COMMUNICATION SYSTEM

CROSS-REFERENCE TO RELATED APPLICATIONS

The present Application claims priority to and is a continuation of U.S. application Ser. No. 16/527,689, filed on Jul. 31, 2019, entitled "METHOD AND APPARATUS FOR APPLYING SLOT FORMAT INDICATION (SFI) TO A CELL IN UNLICENSED SPECTRUM IN A WIRELESS COMMUNICATION SYSTEM", which claims the benefit of U.S. Provisional Patent Application Ser. No. 62/717,241 filed on Aug. 10, 2018. The entire disclosure of U.S. application Ser. No. 16/527,689 and the entire disclosure of U.S. Provisional Patent Application Ser. No. 62/717,241 are incorporated herein in their entirety by reference.

FIELD

This disclosure generally relates to wireless communication networks, and more particularly, to a method and apparatus for applying a Slot Format Indication (SFI) to a cell in unlicensed spectrum in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), a Slot Format Indication (SFI) is received within a first Channel Occupancy Time (COT) of a serving cell. The SFI is indicative of one or more slot formats of one or more slots of the serving cell. A first signal indicative of an ending position of the first COT is received. A beginning of at least one slot of the one or more slots is after the ending position. The UE determines whether to apply a slot format, of a slot of the one or more slots, to the slot based upon whether the slot is within the first COT, wherein the slot format of the slot is indicated by the SFI.

BRIEF DESCRIPTION OF THE DRAWINGS

FIG. 5A illustrates a first portion of a table associated with slot formats in a normal Cyclic Prefix (CP).

FIG. 5B illustrates a second portion of a table associated with slot formats in a normal CP.

FIG. 6A illustrates a table associated with orthogonal frequency-division multiplexing (OFDM) numerologies.

FIG. 6B illustrates a table associated with a number of OFDM symbols per slot, a number of slots per frame and a number of slots per subframe for a normal CP.

FIG. 7A illustrates an exemplary TDD-UL-DL-Config information element.

FIG. 7B illustrates an exemplary SlotFormatCombinationsPerCell information element.

FIG. 7C illustrates an exemplary SlotFormatIndicator information element.

FIG. 8A illustrates a table comprising supported Downlink Control Information (DCI) formats.

FIG. 8B illustrates a table associated with channel access priority classes.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.213 V15.2.0, 3rd Generation Partnership Project, "Technical Specification Group Radio Access Network", "NR", "Physical layer procedures for control", Release 15; 3GPP TS 38.211 V15.2.0, 3rd Generation Partnership Project; "Technical Specification Group Radio Access Network", "NR", "Physical channels and modulation", Release 15; Final Report of 3GPP TSG RAN WG1 #AH_1801 v1.0.0, Vancouver, Canada, 22-26 Jan. 2018; Final Report of 3GPP TSG RAN WG1 #92 v1.0.0, Athens, Greece, 26 Feb.-2 Mar. 2018; Final Report of 3GPP TSG RAN WG1 #92bis v1.0.0, Sanya, China, 16-20 Apr. 2018; Draft Report of 3GPP TSG RAN WG1 #93 v0.2.0, Busan, South Korea, 21-25 May 2018; 3GPP TS 38.331 V15.2.0, 3rd Generation Partnership Project, "Technical Specification Group Radio Access Network", "NR", "Radio Resource Control (RRC) protocol specification", Release 15; R1-1807386, "TxOP Frame Structure for NR unlicensed", Qualcomm Incorporated; R1-1806105, "Frame structure for NR-U operation", Nokia, Nokia Shanghai Bell; 3GPP TS 38.212 V15.2.0, 3rd Generation Partnership Project; "Technical Specification Group Radio Access Network", "NR", "Multiplexing and channel coding", Release 15; 3GPP TS 36.213 V15.1.0 (2018-03), 3rd Generation Partnership Project, "Technical Specification Group Radio Access Network", "NR", "Physical layer procedures", Release 15; 3GPP TS 37.213 V15.0.0 (2018-06), 3rd Generation Partnership Project, "Technical Specification Group Radio Access Network", "NR", "Physical layer procedures for shared spectrum channel access", Release 15. The standards and documents listed above are hereby expressly incorporated by reference in their entirety.

Figure 1:
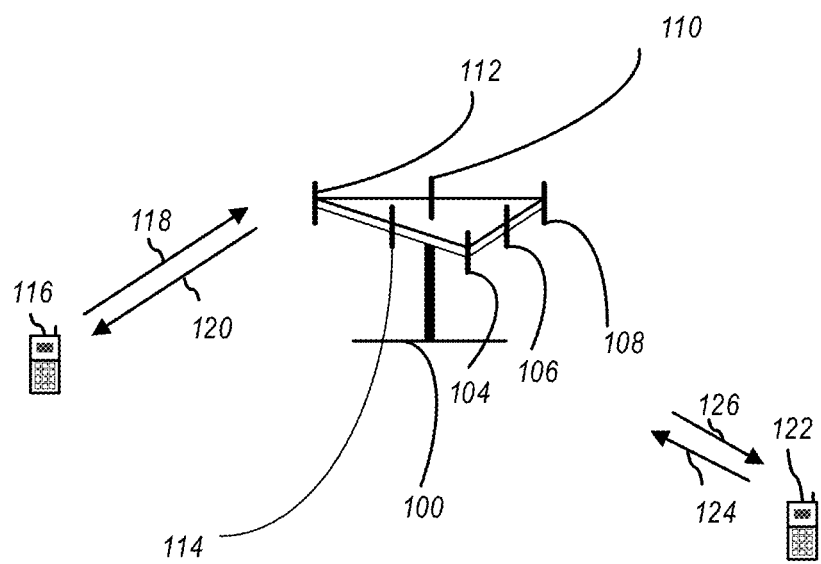
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a gNB, a network node, a network, or some other terminology. An access terminal (AT) may also be called user equipment (UE), a wireless communication device, terminal, access terminal or some other terminology.

Figure 2:
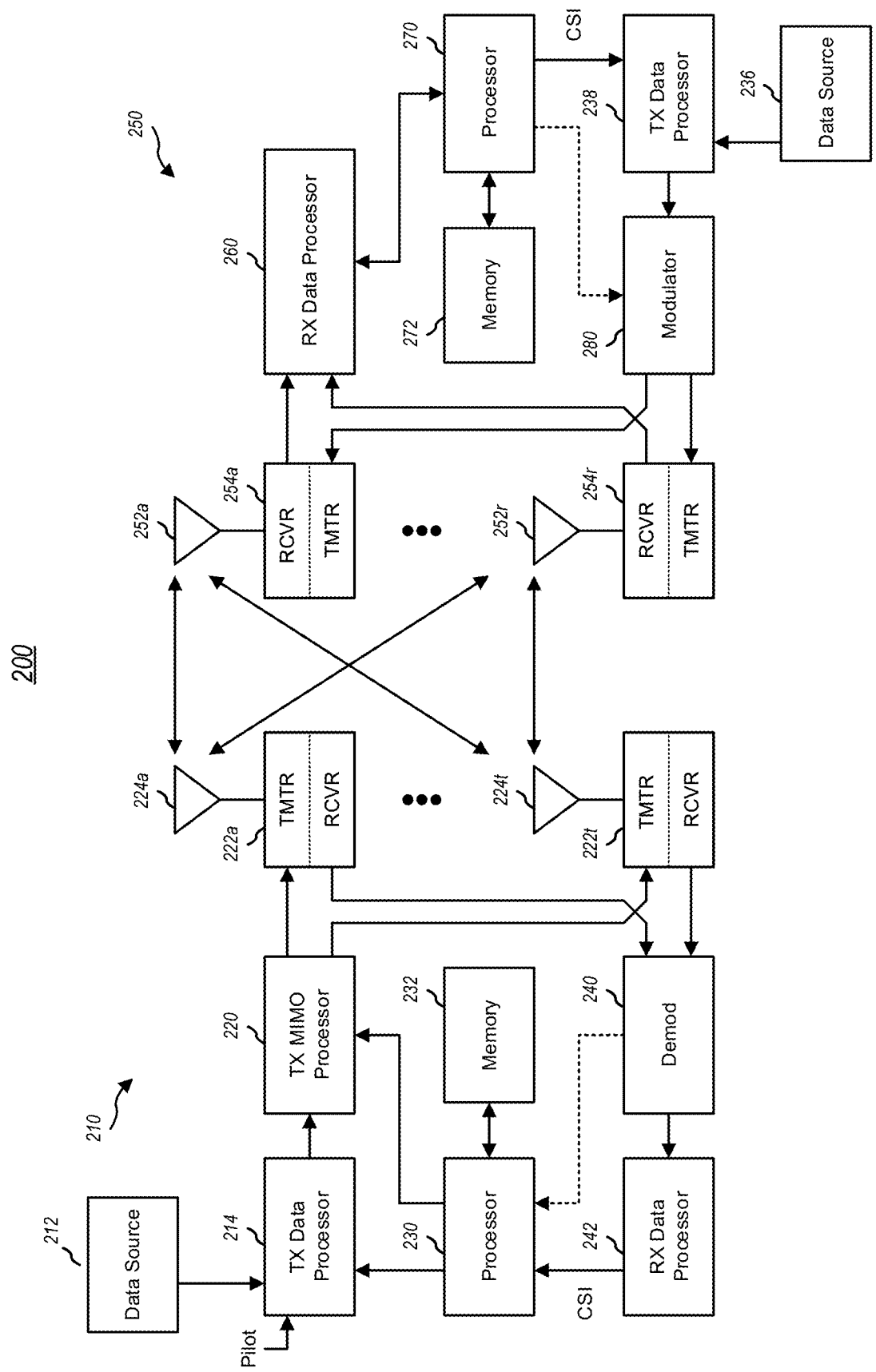
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
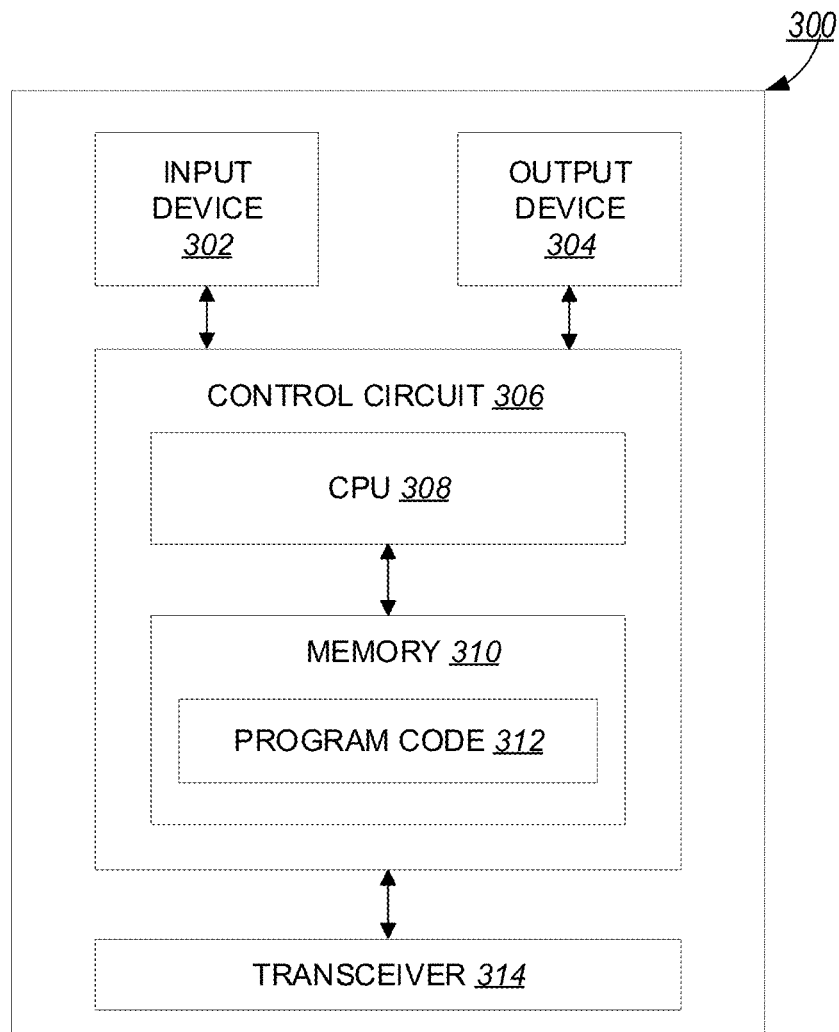
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
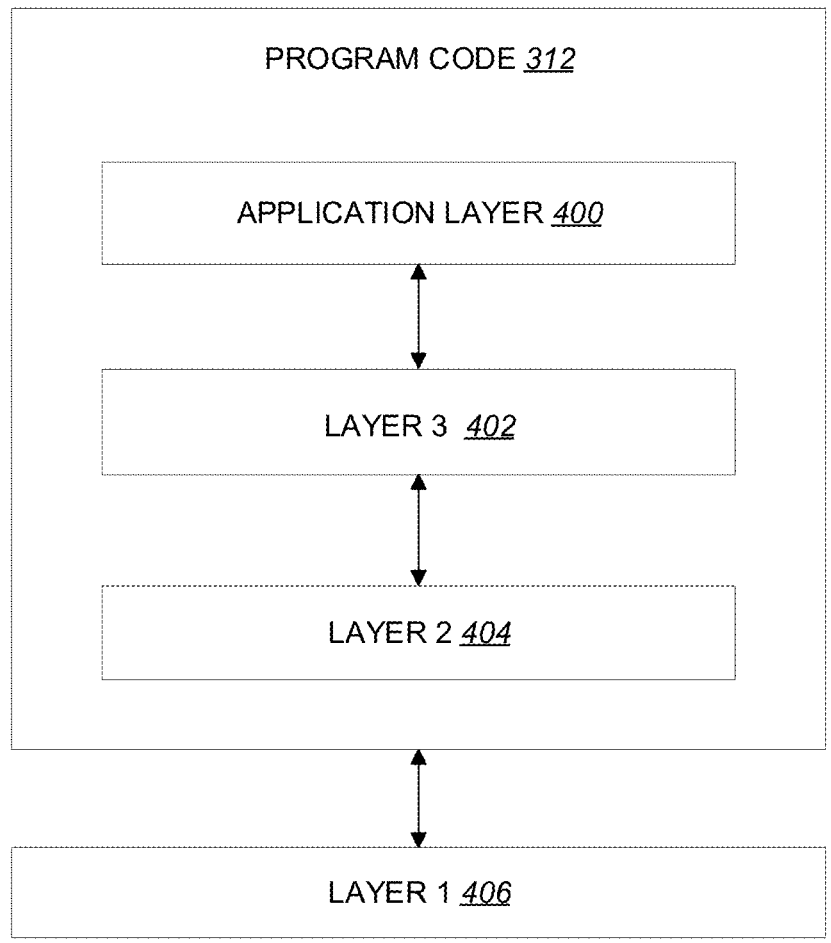
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 38.213 V15.2.0 provides information associated with Radio Access Technology (RAT) and/or New RAT (NR), Physical Downlink Control Channel (PDCCH) monitoring, slot format, frame structure and Bandwidth Part (BWP). In some examples, for each downlink BWP configured to a UE in a serving cell, the UE is provided by higher layers with S>10 search space sets where, for each search space set from the S search space sets, the UE is provided with one or more of the following by a higher layer parameter (e.g., higher layer parameter SearchSpace): a search space set index s, where 0≤s≤40, by a higher layer parameter searchSpaceId; an association between the search space set s and a control resource set p by a higher layer parameter controlResourceSetId; a PDCCH monitoring periodicity of $k_{p,s}$ slots and/or a PDCCH monitoring offset of $o_{p,s}$ slots, by higher layer parameter monitoringSlotPeriodicityAndOffset; a PDCCH monitoring pattern within a slot, indicating one or more first symbols of the control resource set within a slot for PDCCH monitoring, by higher layer parameter monitoringSymbolsWithinSlot; a number of PDCCH candidates $M_{p,s}^{(L)}$ per Control Channel Element (CCE) aggregation level L by higher layer parameters aggregationLevel1, aggregationLevel2, aggregationLevel4, aggregationLevel8, and/or aggregationLevel16, for CCE aggregation level 1, CCE aggregation level 2, CCE aggregation level 4, CCE aggregation level 8 and/or CCE aggregation level 16, respectively; an indication that the search space set s is a common search space set or a UE-specific search space set by higher layer parameter searchSpaceType.

In some examples, if the search space set s is a common search space set, the UE is provided with one or more of the following by the higher layer parameter SearchSpace: an indication by higher layer parameter dci-Format0-0-And-Format1-0 to monitor PDCCH candidates for Downlink Control Information (DCI) format 0_0 and DCI format 1_0 with Cyclic Redundancy Checksum (CRC) scrambled by a Cell Radio Network Temporary Identifier (RNTI) (C-RNTI), a Configured Scheduling (CS) RNTI (CS-RNTI) (if configured), a Random Access RNTI (RA-RNTI), a Temporary Cell RNTI (TC-RNTI), Paging RNTI (P-RNTI) and/or a System Information RNTI (SI-RNTI); an indication by higher layer parameter dci-Format2-0 to monitor one or more PDCCH candidates for DCI format 2_0 and/or a corresponding CCE aggregation level; an indication by higher layer parameter dci-Format2-1 to monitor PDCCH candidates for DCI format 2_1; an indication by higher layer parameter dci-Format2-2 to monitor PDCCH candidates for DCI format 2_2; an indication by higher layer parameter dci-Format2-3 to monitor PDCCH candidates for DCI format 2_3. In some examples, if the search space set s is a UE-specific search space set, the UE is provided with the following by the higher layer parameter SearchSpace: an indication by higher layer parameter dci-Formats to monitor PDCCH candidates either for DCI format 0_0 and DCI format 1_0 or for DCI format 0_1 and DCI format 1_1.

In some examples, the UE is also provided with, via higher layer parameter duration, a duration of $T_{p,s} < k_{p,s}$ slots indicative of a number of slots that the search space set s comprises. In some examples, if the higher layer parameter monitoringSymbolsWithinSlot indicates to a UE only one PDCCH monitoring occasion within a slot, the UE does not expect to be configured with a PDCCH subcarrier spacing other than 15 kHz for the corresponding search space set s if the control resource set p associated with the search space set s includes at least one symbol after the third symbol of the slot.

If the UE is configured with a Secondary Cell Group (SCG), the UE may apply and/or perform one or more procedures associated with a Master Cell Group (MCG) and/or the SCG. In some examples, in association with procedures that are applied for the MCG, the terms 'secondary cell', 'secondary cells', 'serving cell' and/or 'serving cells' may refer to secondary cell, secondary cells, serving cell and/or serving cells associated with the MCG, respectively. In some examples, in association with procedures that are applied for the SCG, the terms 'secondary cell', 'secondary cells', 'serving cell' and/or 'serving cells' may refer to secondary cell, secondary cells (not including Primary Secondary Cell (PSCell)), serving cell and/or serving cells associated with the SCG, respectively. Alternatively and/or additionally, the term 'primary cell' may refer to the PSCell of the SCG.

In some examples, a slot format includes downlink symbols, uplink symbols and flexible symbols. In some examples, for each serving cell, if a UE is provided with higher layer parameter tdd-UL-DL-Configuration-Common and/or the UE is not provided with a higher layer parameter tdd-UL-DL-Configuration-Common2, the UE sets the slot format per slot per slot over a number of slots as indicated by the higher level parameter tdd-UL-DL-Configuration-Common. In some examples, the higher level parameter tdd-UL-DL-Configuration-Common provides one or more of the following: a reference subcarrier spacing $\mu_{ref}$ by higher layer parameter referenceSubcarrierSpacing; a slot configuration period of P ms (milliseconds) by higher layer parameter dl-UL-TransmissionPeriodicity; a number of slots $d_{slots}$ with only downlink symbols by higher layer parameter nrofDownlinkSlots; a number of downlink symbols $d_{sym}$ by higher layer parameter nrofDownlinkSymbols; a number of slots $u_{slots}$ with only uplink symbols by higher layer parameter nrofUplinkSlots; a number of uplink symbols $u_{sym}$ by higher layer parameter nrofUplinkSymbols.

In some examples, a value P=0.625 ms is valid for $\mu_{ref}$-3. In some examples, a value P=1.25 ms is valid is valid for $\mu_{ref}$-2 and/or $\mu_{ref}$-3. In some examples, a value P=2.5 ms is valid for $\mu_{ref}$-1, $\mu_{ref}$-2 and/or $\mu_{ref}$-3

In some examples, a slot configuration period of P (ms) includes $S=P \times 2^{\mu ref}$ slots with $\mu_{ref}$ subcarrier spacing. In some examples, from the S slots, a first $d_{slots}$ slots include merely downlink symbols and/or a last $u_{slots}$ slots include merely uplink symbols. In some examples, the $d_{sym}$ symbols after the first $d_{slots}$ are downlink symbols. In some examples, the $u_{sym}$ symbols before the last $u_{slots}$ slots are uplink symbols. In some examples, remaining symbols (e.g., $(S-d_{slots}-u_{slots}) \times N_{symb}^{slot}-d_{sym}-u_{sym}$ symbols) are flexible symbols.

In some examples, a first symbol every 20/P periods is a first symbol in an event frame. In some examples, a UE expects that the reference subcarrier spacing $\mu_{ref}$ is smaller than or equal to the subcarrier spacing $\mu$ for one or more BWPs of configured downlink BWPs and/or uplink BWPs.

In some examples, if the UE is provided with higher layer parameters tdd-UL-DL-ConfigurationCommon and tdd-UL-DL-ConfigurationCommon2, the UE sets the slot format per slot over a first number of slots as indicated by higher layer parameter tdd-UL-DL-ConfigurationCommon and the UE sets the slot format per slot over a second number of slots as indicated by tdd-UL-DL-ConfigurationCommon2. In some examples, In some examples, the higher level parameter tdd-UL-DL-Configuration-Common2 provides one or more of the following: a reference subcarrier spacing $\mu_{ref,2}$ by higher layer parameter referenceSubcarrierSpacing; a slot configuration period of $P_2$ ms by higher layer parameter dl-UL-TransmissionPeriodicity; a number of slots $d_{slots,2}$ with only downlink symbols by higher layer parameter nrofDownlinkSlots; a number of downlink symbols $d_{sym,2}$ by higher layer parameter nrofDownlinkSymbols; a number of slots $u_{slots,2}$ with only uplink symbols by higher layer parameter nrofUplinkSlots; a number of uplink symbols $u_{sym,2}$ by higher layer parameter nrofUplinkSymbols.

In some examples, a UE expects the subcarrier spacing $\mu$ to be $\mu_{ref}=\mu_{ref,2}$. In some examples, a value $P_2$=0.625 ms is valid for $\mu_{ref,2}$-3. In some examples, a value $P_2$=1.25 ms is valid is valid for $\mu_{ref,2}$-2 and/or $\mu_{ref,2}$-3. In some examples, a value $P_2$=2.5 ms is valid for $\mu_{ref,2}$-1, $\mu_{ref,2}$-2 and/or $\mu_{ref,2}$-3

In some examples, a slot configuration period of $P+P_2$ slots includes first $S=P \times 2^{\mu ref}$ slots and/or second $S_2=P_2 \times 2^{\mu ref}$ slots. In some examples, from the $S_2$ slots, a first $d_{slots,2}$ slots include merely downlink symbols and/or a last $u_{slots,2}$ slots include merely uplink symbols. In some examples, the $d_{sym,2}$ symbols after the first $d_{slots,2}$ are downlink symbols. In some examples, the $u_{sym,2}$ symbols before the last $u_{slots,2}$ slots are uplink symbols. In some examples, remaining symbols (e.g., $(S_2-d_{slots,2}-u_{slots,2}) \times N_{symb}^{slot}-d_{sym,2}-u_{sym,2}$ symbols) are flexible symbols. In some examples, the UE expects that $P+P_2$ divides 20 ms. In some examples, a first symbol every $20/(P+P_2)$ periods is a first symbol in an event frame.

In some examples, if the UE is provided with higher layer parameter tdd-UL-DL-ConfigDedicated, the higher layer parameter tdd-UL-DL-ConfigDedicated overrides flexible symbols per slot over a number of slots provided by tdd-UL-DL-ConfigurationCommon and/or tdd-UL-DL-ConfigurationCommon2. In some examples, the higher layer parameter tdd-UL-DL-ConfigDedicated provides one or more of the following: a set of slot configurations by higher layer parameter slotSpecificConfigurationsToAddModList; a slot index for a slot provided by higher layer parameter slotIndex for each slot configuration of a set of slot configurations; a set of symbols for a slot by higher layer parameter symbols for each slot configuration of the set of slot configurations, where if the higher layer parameter symbols=allDownlink, all symbols in the slot are downlink, if the higher layer parameter symbols=allUplink, all symbols in a slot are uplink, if the higher layer parameter symbols=explicit and if a higher layer parameter nrofDownlinkSymbols is not provided, there are no downlink first symbols in the slot and/or if the higher layer parameter symbols=explicit and if a higher layer parameter nrofUplinkSymbols is not provided, there are no uplink last symbols in the slot where remaining symbols in the slot are flexible. In some examples, the higher layer parameter nrofDownlinkSymbols provides a number of downlink first symbols in the slot and the higher layer parameter nrofUplinkSymbols provides a number of uplink last symbols in the slot. In some examples, remaining symbols in the slot are flexible.

In some examples, for each slot having a corresponding index provided by higher layer parameter slotIndex, the UE applies a format provided by the higher layer parameter symbols. In some examples, the UE does not expect tdd-UL-DL-ConfigDedicated to be indicative of a symbol being uplink if the symbol is defined to be downlink by higher layer parameter tdd-UL-DL-ConfigurationCommon and/or higher layer parameter tdd-UL-DL-ConfigurationCommon2. In some examples, the UE does not expect tdd-UL-DL-ConfigDedicated to be indicative of a symbol being downlink if the symbol is defined to be uplink by higher layer parameter tdd-UL-DL-ConfigurationCommon and/or higher layer parameter tdd-UL-DL-ConfigurationCommon2.

In some examples, for each slot configuration provided by higher layer parameter tdd-UL-DL-ConfigDedicated, a reference subcarrier spacing is the reference subcarrier spacing $\mu_{ref}$ provided by higher layer parameter tdd-UL-DL-ConfigurationCommon.

In some examples, a slot configuration period and/or a number of downlink symbols, uplink symbols and/or flexible symbols in each slot of the slot configuration period are determined from higher layer parameters tdd-UL-DL-ConfigurationCommon, tdd-UL-DL-ConfigurationCommon2 and/or tdd-UL-DL-ConfigDedicated and are common to each configured BWP.

In some examples, a UE considers symbols in a slot indicated as downlink by higher layer parameters tdd-UL-DL-ConfigurationCommon, tdd-UL-DL-ConfigurationCommon2 and/or tdd-UL-DL-ConfigDedicated to be available for receptions (of data) and/or the UE considers symbols in a slot indicated as uplink by higher layer parameters tdd-UL-DL-ConfigurationCommon, tdd-UL-DL-ConfigurationCommon2 and/or by tdd-UL-DL-ConfigDedicated to be available for transmissions (of data).

In some examples, if a UE is not configured to monitor PDCCH for DCI format 2-0 and/or if a set of symbols of a slot are indicated as flexible by higher layer parameters tdd-UL-DL-ConfigurationCommon, tdd-UL-DL-ConfigurationCommon2 and/or tdd-UL-DL-ConfigDedicated (and/or when higher layer parameters tdd-UL-DL-Configuration-Common, tdd-UL-DL-ConfigurationCommon2 and/or tdd-UL-DL-ConfigDedicated are not provided to the UE), one or more operations may be performed by the UE. In some examples, the one or more operations comprise receiving Physical Downlink Shared Channel (PDSCH) and/or Channel State Information based Reference Signal (CSI-RS) in the set of symbols of the slot if the UE receives a corresponding indication by a DCI format 1_0, a DCI format 1_1 and/or a DCI format 0_1. In some examples, the one or more operations comprise transmitting Physical Uplink Shared Channel (PUSCH), Physical Uplink Control Channel (PUCCH), Physical Random Access Channel (PRACH) and/or Sounding Reference Signal (SRS) in the set of symbols of the slot if the UE receives a corresponding indication by a DCI format 0_0, DCI format 0_1, DCI format 1_0, DCI format 1_1, and/or DCI format 2_3.

In some examples, if the UE is configured by higher layers to receive a PDCCH, a PDSCH and/or a CSI-RS in the set of symbols of the slot, the one or more operations may comprise receiving the PDCCH, the PDSCH and/or the CSI-RS if the UE does not detect a DCI format 0_0, DCI format 0_1, DCI format 1_0, DCI format 1_1, and/or DCI format 2_3 that indicates to the UE to transmit a PUSCH, a PUCCH, a PRACH and/or an SRS in the set of symbols of the slot. In some examples, if the UE is configured by higher layers to receive a PDCCH, a PDSCH and/or a CSI-RS in the set of symbols of the slot, the one or more operations may comprise receiving the PDCCH, the PDSCH and/or the CSI-RS if the UE detects a DCI format 0_0, DCI format 0_1, DCI format 1_0, DCI format 1_1, and/or DCI format 2_3 that indicates to the UE to transmit a PUSCH, a PUCCH, a PRACH and/or an SRS in the set of symbols of the slot and/or if a number of symbols between a last symbol of a control resource set where the UE detects the DCI format 0_0, DCI format 0_1, DCI format 1_0, DCI format 1_1, and/or DCI format 2_3 and a first symbol in the set of symbols is smaller than a PUSCH preparation time $N_2$ for a corresponding PUSCH timing capability.

Alternatively and/or additionally, the UE may not receive the PDCCH, the PDSCH and/or the CSI-RS in the set of symbols of the slot. In some examples, the UE may transmit the PUSCH, the PUCCH, the PRACH and/or the SRS in the set of symbols of the slot if the UE is configured by higher layers to transmit a periodic SRS, a PUCCH, a PUSCH and/or a PRACH in the set of symbols in the slot, if the UE does not detect a DCI format 1_0, DCI format 1_1 and/or DCI format 0_1 that indicates to the UE to receive PDSCH and/or CSI-RS in the set of symbols in the slot and/or if the UE detects a DCI format 1_0, DCI format 1_1 and/or DCI format 0_1 that indicates to the UE to receive PDSCH or CSI-RS in the set of symbols in the slot and a number of symbols between a last symbol of a control resource set where the UE detects the DCI format 1_0 and/or DCI format 1_1 and a first symbol in the set of symbols is smaller than the PUSCH preparation time $N_2$ for the corresponding PUSCH timing capability. Alternatively and/or additionally, the UE does not transmit the periodic SRS, the PUCCH, the PUSCH and/or the PRACH in the set of symbols of the slot.

In some examples, the PUSCH preparation time $N_2$ is defined with respect to a subcarrier spacing of the PDCCH providing a corresponding DCI format. In some examples, for a set of symbols of a slot that are indicated to a UE as uplink by higher layer parameters tdd-UL-DL-ConfigurationCommon, tdd-UL-DL-ConfigurationCommon2 and/or tdd-UL-DL-ConfigDedicated, when provided to the UE, the UE may not receive PDCCH, PDSCH and/or CSI-RS in the set of symbols of the slot.

In some examples, for a set of symbols of a slot that are indicated to a UE as downlink by higher layer parameters tdd-UL-DL-ConfigurationCommon, tdd-UL-DL-ConfigurationCommon2, and/or tdd-UL-DL-ConfigDedicated, when provided to the UE, the UE may not transmit PUSCH, PUCCH, PRACH, and/or SRS in the set of symbols of the slot.

In some examples, for a set of symbols of a slot that are indicated to a UE as flexible by higher layer parameters tdd-UL-DL-ConfigurationCommon, tdd-UL-DL-ConfigurationCommon2, and/or tdd-UL-DL-ConfigDedicated, when provided to the UE, the UE does not expect to receive both dedicated higher layer parameters configuring transmission from the UE in the set of symbols of the slot and dedicated higher layer parameters configuring reception by the UE in the set of symbols of the slot.

In some examples, if a UE is configured by higher layers with a parameter SlotFormatIndicator, the UE is provided with a Slot Format Indication Radio Network Temporary Identifier (SFI-RNTI) by higher layer parameter sfi-RNTI and/or with a payload size of DCI format 2_0 by a higher layer parameter dci-PayloadSize. In some examples, the UE is provided, in one or more serving cells, with a configuration for a search space set s and/or a corresponding control resource set p for monitoring $M_{p,s}^{LSFI}$ PDCCH candidates for DCI format 2_0 with a CCE aggregation level of $L_{SFI}$ CCEs. In some examples, the $M_{p,s}^{LSFI}$ PDCCH candidates are the first PDCCH candidates for CCE aggregation level $L_{SFI}$ for search space set s in control resource set p.

In some examples, for each serving cell in the set of serving cells, the UE is provided with one or more of the following: an identity of the serving cell by higher layer parameter servingCellId; a location of an SFI-index field in DCI format 2_0 by higher layer parameter positionInDCI; a set of slot format combinations by higher layer parameter slotFormatCombinations, where each slot format combination in the set of slot format combinations comprises one or more slot formats indicated by a higher layer parameter slotFormats for the slot format combination and/or a mapping for the slot format combination provided by slotFormats to a corresponding SFI-index field value in DCI format 2_0 provided by higher layer parameter slotFormatCombinationId; for unpaired spectrum operation, a reference subcarrier spacing $\mu_{SFI}$ by higher layer parameter subcarrier-Spacing and/or, when a supplementary uplink carrier is configured for the serving cell, a reference subcarrier spacing $\mu_{SFI,SUL}$ by higher layer parameter subcarrierSpacing2 for the supplementary uplink carrier; for paired spectrum operation, a reference subcarrier spacing $\mu_{SFI,DL}$ for a downlink BWP by higher layer parameter subcarrierSpacing and/or a reference subcarrier spacing $\mu_{SFI,UL}$ for an uplink BWP by higher layer parameter subcarrierSpacing2.

An SFI-index field value in a DCI format 2_0 indicates, to a UE, a slot format for each slot of a number of slots for each downlink BWP and/or each uplink BWP starting from a slot where the UE detects the DCI format 2_0. In some examples, the number of slots is greater than or equal to a PDCCH monitoring periodicity for DCI format 2_0. In some examples, the SFI-index field includes $\log_2$(maxSFIindex) bits, where maxSFIindex is a maximum value of values provided by a corresponding higher layer parameter slotFormatCombinationId.

FIGS. 5A-5B illustrate a table associated with slot formats in a normal Cyclic Prefix (CP). FIG. 5A illustrates a first portion 500 of the table and FIG. 5B illustrates a second portion 550 of the table. In some examples, symbols in a slot can be classified as 'downlink' (denoted 'D' in the table), 'flexible' (denoted 'X' in the table) and/or 'uplink' (denoted 'U' in the table).

In some examples, if a PDCCH monitoring periodicity for DCI format 2_0, provided to a UE for the search space set s by higher layer parameter monitoringSlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, the UE expects each of the more than one DCI formats 2_0 to indicate a same format for the slot. In some examples, a UE does not expect to be configured to monitor PDCCH for DCI format 2_0 on a second serving cell that uses larger subcarrier spacing than the serving cell.

In some examples, for unpaired spectrum operation for a UE on a serving cell, the UE is provided with, via higher layer parameter subcarrierSpacing, a reference subcarrier spacing configuration of $\mu_{SFI}$ for each slot format in a combination of slot formats indicated by an SFI-index field in DCI format 2_0. In some examples, the UE expects that for a reference subcarrier spacing configuration of $\mu_{SFI}$ and/or for an active downlink BWP and uplink BWP pair with subcarrier spacing configuration of $\mu$, $\mu > \mu_{SFI}$ is true. In some examples, each slot format in the combination of slot formats indicated by the SFI-index field in DCI format 2_0 is applicable to $2^{(\mu-\mu_{SFI})}$ consecutive slots in the active downlink BWP and uplink BWP pair where the first slot starts at a same time as a first slot for the reference subcarrier spacing configuration of $\mu_{SFI}$ and each downlink, flexible or uplink symbol for the reference subcarrier spacing configuration of $\mu_{SFI}$ corresponds to $2^{(\mu-\mu_{SFI})}$ consecutive downlink, flexible or uplink symbols for the subcarrier spacing configuration $\mu$.

In some examples, for paired spectrum operation for a UE on a serving cell, the SFI-index field in DCI format 2_0 indicates a combination of slot formats that includes a combination of slot formats for a reference downlink BWP and a combination of slot formats for a reference uplink BWP of the serving cell. In some examples, the UE may be provided with, via higher layer parameter subcarrierSpacing, a reference subcarrier spacing configuration of $\mu_{SFI,DL}$ for the combination of slot formats indicated by the SFI-index field in DCI format 2_0 for the reference downlink BWP of the serving cell. In some examples, the UE may be provided with, via higher layer parameter subcarrierSpacing2, a reference subcarrier spacing configuration of $\mu_{SFI,UL}$ for the combination of slot formats indicated by the SFI-index field in DCI format 2_0 for the reference uplink BWP of the serving cell. If $\mu_{SFI, DL} \geq \mu_{SFI, UL}$, for each $2^{(\mu_{SFI, DL}-\mu_{SFI, UL})}+1$ values provided by a value of higher layer parameter slotFormats, the first $2^{(\mu_{SFI, DL}-\mu_{SFI, UL})}$ values for the combination of slot formats are applicable to the reference downlink BWP and the next value is applicable to the reference uplink BWP. The value of higher layer parameter slotFormats may be determined by a value of slotFormatCombinationId in slotFormatCombination and the value of slotFormatCombinationId is set by the value of the SFI-index field value in DCI format 2_0. If $\mu_{SFI, DL} < \mu_{SFI, UL}$, for each $2^{(\mu_{SFI, UL}-\mu_{SFI, DL})}+1$ values provided by higher layer parameter slotFormats, the first value for the combination of slot formats is applicable to the reference downlink BWP and the next $2^{(\mu_{SFI, UL}-\mu_{SFI, DL})}$ values are applicable to the reference uplink BWP.

In some examples, the UE is provided with a reference subcarrier spacing configuration of $\mu_{SFI,DL}$ such that for an active downlink BWP with subcarrier spacing configuration of $\mu_{DL}$, $\mu_{DL} \geq \mu_{SFI, DL}$ is true. In some examples, the UE is provided with a reference subcarrier spacing configuration of $\mu_{SFI,UL}$ such that for an active uplink BWP with subcarrier spacing configuration of $\mu_{UL}$, $\mu_{UL} \geq \mu_{SFI, UL}$ is true. In some examples, each slot format for a combination of slot formats indicated by the SFI-index field in DCI format 2_0 for the reference downlink BWP, by indicating a value for slotFormatCombinationId that is mapped to a value of slotFormats in slotFormatCombination, is applicable to $2^{(\mu_{DL}-\mu_{SFI, DL})}$ consecutive slots for the active downlink BWP where the first slot starts at a same time as a first slot in the reference downlink BWP and/or each downlink or flexible symbol for the reference subcarrier spacing configuration of $\mu_{SFI,DL}$ corresponds to $2^{(\mu_{DL}-\mu_{SFI,DL})}$ consecutive downlink or flexible symbols for the subcarrier spacing configuration $\mu_{DL}$. In some examples, each slot format for the combination of slot formats for the reference uplink BWP is applicable to $2^{(\mu_{UL}-\mu_{SFI, UL})}$ consecutive slots for the active uplink BWP where the first slot starts at a same time as a first slot in the reference uplink BWP and each uplink or flexible symbol for the reference subcarrier spacing configuration of $\mu_{SFI,UL}$ corresponds to $2^{(\mu_{UL}-\mu_{SFI,UL})}$ consecutive uplink or flexible symbols for the subcarrier spacing configuration $\mu_{UL}$.

In some examples, for unpaired spectrum operation with a second uplink carrier for a UE on a serving cell, the SFI-index field in DCI format 2_0 indicates a combination of slot formats that includes a combination of slot formats for a reference first uplink carrier of the serving cell and a combination of slot formats for a reference second uplink carrier of the serving cell. In some examples, the UE is provided with, via higher layer parameter subcarrierSpacing, a reference subcarrier spacing configuration of $\mu_{SFI}$ for the combination of slot formats indicated by the SFI-index field in DCI format 2_0 for the reference first uplink carrier of the serving cell. In some examples, the UE is provided with, via higher layer parameter subcarrierSpacing2, a reference subcarrier spacing configuration of $\mu_{SFI,SUL}$ for the combination of slot formats indicated by the SFI-index field in DCI format 2_0 for the reference second uplink carrier of the serving cell. In some examples, for each $2^{(\mu_{SFI}-\mu_{SFI, SUL})}+1$ values of higher layer parameter slotFormats, the first $2^{(\mu_{SFI}-\mu_{SFI, SUL})}$ values for the combination of slot formats are applicable to the reference first uplink carrier and the next value is applicable to the reference second uplink carrier.

In some examples, the UE expects to be provided with a reference subcarrier spacing configuration of $\mu_{SFI,SUL}$ such that for an active uplink BWP in the second uplink carrier with subcarrier spacing configuration of $\mu_{SUL}$, $\mu_{SUL} \geq \mu_{SFI, SUL}$ is true. In some examples, each slot format for a combination of slot formats indicated by the SFI-index field in DCI format 2_0 for the reference first uplink carrier is applicable to $2^{(\mu-\mu_{SFI})}$ consecutive slots for the active downlink BWP and uplink BWP pair in the first uplink carrier where the first slot starts at a same time as a first slot in the reference first uplink carrier. In some examples, each slot format for the combination of slot formats for the reference second uplink carrier is applicable to $2^{(\mu_{SUL}-\mu_{SFI, SUL})}$ consecutive slots for the active uplink BWP in the second uplink carrier where the first slot starts at a same time as a first slot in the reference second uplink carrier.

In some examples, if a BWP in the serving cell is configured with $\mu$-2 and/or with extended CP, the UE expects $\mu_{SFI}$-1, $\mu_{SFI}$-1 and/or $\mu_{SFI}$-2. In some examples, a format for a slot with extended CP is determined based upon a format for a slot with normal CP. In some examples, a UE determines that an extended CP symbol is a downlink symbol if a normal CP symbol overlapping with the extended CP symbol is a downlink symbol. Alternatively and/or additionally, a UE determines that an extended CP symbol is an uplink symbol if a normal CP symbol overlapping with the extended CP symbol is an uplink symbol. Alternatively and/or additionally, a UE determines that an extended CP symbol is a flexible symbol if a normal CP symbol overlapping with the extended CP symbol is a flexible symbol. In some examples, more than one normal CP symbols overlap with an extended CP symbol. In some examples, a UE determines that the extended symbol is a flexible symbol if one or more symbols of the more than one normal CP symbols are flexible symbols. Alternatively and/or additionally, a UE determines that the extended symbol is a flexible symbol if the more than one normal CP symbols comprise both one or more downlink symbols and one or more uplink symbols.

In some examples, a reference subcarrier spacing configuration of $\mu_{SFI}$, $\mu_{SFI,DL}$, $\mu_{SFI,UL}$ and/or $\mu_{SFI,SUL}$ corresponds to 0, 1 and/or 2 for frequency range 1. In some examples, a reference subcarrier spacing configuration of $\mu_{SFI}$, $\mu_{SFI,DL}$, $\mu_{SFI,UL}$ and/or $\mu_{SFI,SUL}$ corresponds to 2 and/or 3 for frequency range 2.

In some examples, for a set of symbols of a slot, a UE does not expect to detect a DCI format 2_0 with an SFI-index field value indicating that the set of symbols of the slot are uplink and to detect a DCI format 1_0, a DCI format 1_1 and/or a DCI format 0_1 instructing the UE to receive PDSCH and/or CSI-RS in the set of symbols of the slot.

In some examples, for a set of symbols of a slot, a UE does not expect to detect a DCI format 2_0 with an SFI-index field value indicating that the set of symbols in the slot are downlink and to detect a DCI format 0_0, a DCI format 0_1, a DCI format 1_0, a DCI format 1_1 and/or a DCI format 2_3 instructing the UE to transmit PUSCH, PUCCH, PRACH and/or SRS in the set of symbols of the slot.

In some examples, for a set of symbols of a slot that are indicated to be downlink by higher layer parameters tdd-UL-DL-ConfigurationCommon, tdd-UL-DL-ConfigurationCommon2 and/or tdd-UL-DL-ConfigDedicated, when provided to a UE, the UE does not expect to detect a DCI format 2_0 with an SFI-index field value indicating that the set of symbols of the slot are uplink and/or flexible.

In some examples, for a set of symbols of a slot that are indicated to be uplink by higher layer parameters tdd-UL-DL-ConfigurationCommon, tdd-UL-DL-ConfigurationCommon2 and/or tdd-UL-DL-ConfigDedicated, when provided to a UE, the UE does not expect to detect a DCI format 2_0 with an SFI-index field value indicating that the set of symbols of the slot are downlink and/or flexible.

In some examples, for a set of symbols of a slot, a condition is met if the set of symbols are indicated to a UE to be flexible by higher layer parameters tdd-UL-DL-ConfigurationCommon, tdd-UL-DL-ConfigurationCommon2 and/or tdd-UL-DL-ConfigDedicated, when provided to the UE. Alternatively and/or additionally, the condition is met if higher layer parameters tdd-UL-DL-ConfigurationCommon, tdd-UL-DL-ConfigurationCommon2 and/or tdd-UL-DL-ConfigDedicated are not provided to the UE and if the UE detects a DCI format 2_0 providing a format for the slot using a slot format value other than 255.

In some examples, if the condition is met and/or if one or more symbols from the set of symbols are symbols in a control resource set configured to the UE for PDCCH monitoring, the UE receives PDCCH in the control resource set if an SFI-index field value in DCI format 2_0 indicates that the one or more symbols are downlink symbols.

In some examples, if the condition is met and/or if an SFI-index field value in DCI format 2_0 indicates that the set of symbols of the slot are flexible and the UE detects a DCI format 1_0, DCI format 1_1 and/or DCI format 0_1 instructing the UE to receive PDSCH and/or CSI-RS in the set of symbols of the slot, the UE receives the PDSCH and/or the CSI-RS in the set of symbols of the slot.

In some examples, if the condition is met and/or if an SFI-index field value in DCI format 2_0 indicates that the set of symbols of the slot are flexible and the UE detects a DCI format 0_0, DCI format 0_1, DCI format 1_0, DCI format 1_1, or DCI format 2_3 instructing the UE to transmit PUSCH, PUCCH, PRACH and/or SRS in the set of symbols of the slot, the UE transmits the PUSCH, the PUCCH, the PRACH and/or the SRS in the set of symbols of the slot.

In some examples, the UE does not transmit or receive in the set of symbols of the slot if the condition is met, if an SFI-index field value in DCI format 2_0 indicates that the set of symbols of the slot are flexible, if the UE does not detect a DCI format 1_0, DCI format 1_1 and/or DCI format 0_1 instructing the UE to receive PDSCH and/or CSI-RS and/or if the UE does not detect a DCI format 0_0, a DCI format 0_1, a DCI format 1_0, a DCI format 1_1 and/or a DCI format 2_3 instructing the UE to transmit PUSCH, PUCCH, PRACH and/or SRS in the set of symbols of the slot.

In some examples, if the condition is met and/or if the UE is configured by higher layers to receive PDSCH and/or CSI-RS in the set of symbols of the slot, the UE receives the PDSCH and/or the CSI-RS in the set of symbols of the slot merely if an SFI-index field value in DCI format 2_0 indicates that the set of symbols of the slot are downlink.

In some examples, if the condition is met and/or if the UE is configured by higher layers to transmit PUCCH, PUSCH and/or PRACH in the set of symbols of the slot, the UE transmits the PUCCH, the PUSCH and/or the PRACH in the slot merely if an SFI-index field value in DCI format 2_0 indicates that the set of symbols of the slot are uplink.

In some examples, if the condition is met and/or if the UE is configured by higher layers to transmit periodic SRS in the set of symbols of the slot, the UE transmits the periodic SRS merely in a subset of symbols of the set of symbols of the slot that are indicated to be uplink symbols by an SFI-index field value in DCI format 2_0.

In some examples, if the condition is met, the UE does not expect to detect an SFI-index field value in DCI format 2_0 indicating that the set of symbols of the slot are downlink and also detect DCI format 0_0, DCI format 0_1, DCI format 1_0, DCI format 1_1 and/or DCI format 2_3 instructing the UE to transmit SRS, PUSCH, PUCCH and/or PRACH in one or more symbols of the set of symbols of the slot.

In some examples, if the condition is met, the UE does not expect to detect an SFI-index field value in DCI format 2_0 indicating that the set of symbols of the slot are downlink if the set of symbols of the slot includes symbols corresponding to a first repetition of a PUSCH transmission activated by an uplink Type 2 grant PDCCH.

In some examples, if the condition is met, the UE does not expect to detect an SFI-index field value in DCI format 2_0 indicating that the set of symbols of the slot are uplink and also detect DCI format 1_0, DCI format 1_1 and/or DCI format 0_1 instructing the UE to receive PDSCH and/or CSI-RS in one or more symbols of the set of symbols of the slot.

In some examples, if a UE is configured by higher layers to receive a CSI-RS and/or a PDSCH in a set of symbols of a slot and the UE detects a DCI format 2_0 with a slot format value other than 255 that indicates a slot format with a subset of symbols from the set of symbols as uplink and/or flexible, or the UE detects DCI format 0_0, DCI format 0_1, DCI format 1_0, DCI format 1_1 and/or DCI format 2_3 instructing the UE to transmit PUSCH, PUCCH, SRS and/or PRACH in at least one symbol of the set of the symbols, the UE cancels reception of the CSI-RS and/or the PDSCH in the set of symbols of the slot.

In some examples, if a UE is configured by higher layers to transmit periodic SRS, PUCCH, PUSCH and/or PRACH in a set of symbols of a slot and the UE detects a DCI format 2_0 with a slot format value other than 255 that indicates a slot format with a subset of symbols from the set of symbols as downlink and/or flexible and/or the UE detects a DCI format 1_0, DCI format 1_1 and/or DCI format 0_1 instructing the UE to receive CSI-RS and/or PDSCH in at least one symbol of the set of symbols, then the UE does not expect to cancel the transmission in symbols from the subset of symbols that occur, relative to a last symbol of a control resource set where the UE detects the DCI format 2_0, after a number of symbols that is smaller than a PUSCH preparation time $N_2$ for the corresponding PUSCH timing capability and/or the UE may cancel the transmission in remaining symbols of the slot. In some examples, the PUSCH preparation time $N_2$ is defined with respect to a subcarrier spacing of a PDCCH providing DCI format 2_0.

In some examples, a UE assumes that flexible symbols in a control resource set configured to the UE for PDCCH monitoring are downlink symbols if the UE does not detect an SFI-index field value in DCI format 2_0 indicating that the set of symbols of the slot are flexible and/or uplink and the UE does not detect DCI format 0_0, DCI format 0_1, DCI format 1_0, DCI format 1_1 and/or DCI format 2_3 instructing the UE to transmit SRS, PUSCH, PUCCH and/or PRACH in the set of symbols.

For a set of symbols of a slot that are indicated as flexible by higher layer parameters tdd-UL-DL-ConfigurationCommon, tdd-UL-DL-ConfigurationCommon2 and/or tdd-UL-DL-ConfigDedicated, when provided to a UE, and/or when higher layer parameters tdd-UL-DL-ConfigurationCommon, tdd-UL-DL-ConfigurationCommon2 and/or tdd-UL-DL-ConfigDedicated are not provided to the UE, and/or if the UE does not detect a DCI format 2_0 providing a format for the slot, the UE may receive PDSCH and/or CSI-RS in the set of symbols of the slot if the UE receives a corresponding indication by DCI format 1_0, DCI format 1_1 and/or DCI format 0_1. Alternatively and/or additionally, the UE may transmit PUSCH, PUCCH, PRACH and/or SRS in the set of symbols of the slot if the UE receives a corresponding indication by DCI format 0_0, DCI format 0_1, DCI format 1_0, DCI format 1_1 and/or DCI format 2_3. Alternatively and/or additionally, the UE may receive PDCCH. Alternatively and/or additionally, if the UE is configured by higher layers to receive PDSCH and/or CSI-RS in the set of symbols of the slot, the UE may not receive the PDSCH and/or the CSI-RS in the set of symbols of the slot. Alternatively and/or additionally, if the UE is configured by higher layers to transmit periodic SRS, PUCCH, PUSCH and/or PRACH in the set of symbols of the slot, the UE may not transmit the PUCCH, the PUSCH and/or the PRACH in the slot and/or may not transmit the periodic SRS in symbols of the set of symbols in the slot, starting from a symbol that is a number of symbols equal to the PUSCH preparation time $N_2$ for the corresponding PUSCH timing capability after a last symbol of a control resource set where the UE is configured to monitor PDCCH for DCI format 2_0 and/or the UE is not expected to cancel transmission of the periodic SRS, the PUCCH, the PUSCH and/or the PRACH in symbols of the set of symbols in the slot, starting before a symbol that is a number of symbols equal to the PUSCH preparation time $N_2$ for the corresponding PUSCH timing capability after a last symbol of a control resource set where the UE is configured to monitor PDCCH for DCI format 2_0.

3GPP TS 38.211 V15.2.0 provides information associated with NR frame structure, channels and/or numerology design. In some examples, sizes of various fields in the time domain may be expressed in time units (e.g., $T_c=1/(\Delta f_{max} \cdot N_f)$, where $\Delta f_{max}=480 \cdot 10^3$ Hz and $N_f=4096$). In some examples, for a constant, $\kappa=T_s/T_c=64$ is true, where $T_s=1/(\Delta f_{ref} \cdot N_{f,ref})$, $\Delta f_{ref}=15 \cdot 10^3$ Hz and $N_{f,ref}=2048$.

FIG. 6A illustrates a table 600 associated with OFDM numerologies. For example, where $\mu$ and a CP for a BWP may be obtained from higher-layer parameters subcarrierSpacing and cyclicPrefix, respectively.

Downlink transmissions and/or uplink transmissions may be organized into frames with $T_f=(\Delta f_{max} N_f/100) \cdot T_c=10$ ms duration, each consisting of ten subframes (and/or a different number of subframes) of $T_{sf}=(\Delta f_{max} N_f/1000) \cdot T_c=1$ ms duration. A number of consecutive OFDM symbols per subframe may be $N_{symb}^{subframe,\mu}=N_{symb}^{slot}N_{slot}^{subframe,\mu}$. Each frame may be divided into two equally-sized half-frames of five subframes each with half-frame 0 consisting of subframes 0-4 and half-frame 1 consisting of subframes 5-9. There may be one set of frames in the uplink and/or one set of frames in the downlink on a carrier.

FIG. 6B illustrates a table 650 associated with a number of OFDM symbols per slot, a number of slots per frame and a number of slots per subframe for a normal CP. For subcarrier spacing configuration $\mu$, slots may be numbered $n_s^{\mu} \in \{0, \ldots, N_{slot}^{subframe,\mu}-1\}$ in increasing order within a subframe and $n_{s,f}^{\mu} \in \{0, \ldots, N_{slot}^{frame,\mu}-1\}$ in increasing order within a frame. There may be $N_{symb}^{slot}$ consecutive OFDM symbols in a slot where $N_{symb}^{slot}$ depends on the CP associated with the table 650. The start of slot $n_s^{\mu}$ in a subframe is aligned in time with the start of OFDM symbol $n_s^{\mu} N_{symb}^{slot}$ in the same subframe.

In a slot in a downlink frame, a UE shall assume that downlink transmissions occur in 'downlink' and/or 'flexible' symbols. In a slot in an uplink frame, the UE shall only transmit in 'uplink' and/or 'flexible' symbols.

In some examples, a UE that is not capable of full-duplex communication is not expected to transmit in the uplink earlier than $N_{Rx-Tx}T_c$ after the end of the last received downlink symbol in the same cell.

Final Report of 3GPP TSG RAN WG1 #92 v1.0.0 provides that additional functionalities may be required for operation in licensed spectrum in the following deployment scenarios: carrier aggregation between licensed band NR Primary Cell (PCell) and NR-unlicensed (NR-U) Secondary Cell (SCell), where NR-U SCell may have both downlink and uplink capabilities or may merely have downlink capabilities; dual connectivity between licensed band LTE PCell and NR-U PSCell; stand-alone NR-U, an NR cell with downlink in unlicensed band and uplink in licensed band; dual connectivity between licensed band NR PCell and NR-U PSCell.

Draft Report of 3GPP TSG RAN WG1 #93 v0.2.0 provides that single and multiple downlink to uplink and uplink to downlink switching within a shared Next Generation NodeB (gNB) Channel Occupancy Time (COT) may be beneficial and can be supported. Listen-Before-Talk (LBT) requirements for supporting single and/or multiple switching points include one or more of the following: for a gap of less than 16 microseconds (μs), no-LBT is used where restrictions and/or conditions on when no-LBT is used may be identified considering fair coexistence; for a gap of above 16 μs that does not exceed 25 μs, one-shot LBT is used where restrictions and/or conditions on when one-shot LBT is used may be identified considering fair coexistence; for a single switching point, where a gap from downlink transmission to uplink transmission exceeds 25 μs, one-shot LBT is used, where an allowed number of one-shot LBT attempts for granted uplink transmission is not defined; for multiple switching points where a gap from downlink transmission to uplink transmission exceeds 25 μs, one-shot LBT is used.

Draft Report of 3GPP TSG RAN WG1 #93 v0.2.0 provides that benefits of using a signal that facilitates the signal's detection with low complexity may be investigated in association with one or more of the following scenarios: UE power saving; improved coexistence; spatial reuse at least within the same operator network; serving cell transmission burst acquisition.

Draft Report of 3GPP TSG RAN WG1 #93 v0.2.0 provides that NR-U should have a signal that contains at least SS/PBCH block burst set transmission and/or other channels and/or signals transmitted together as part of the signal. Draft Report of 3GPP TSG RAN WG1 #93 v0.2.0 provides that a design of the signal should consider one or more of the following characteristics associated with unlicensed band operation: there are no (or minimal) gaps within a time pan the signal is transmitted within a beam; whether gaps are needed for beam switching and/or, if gaps are needed for beam switching, durations of the gaps; an occupied channel bandwidth is satisfied (or is not satisfied); minimizing COT of the signal; fast channel access.

3GPP TS 38.331 V15.2.0 provides information associated with information elements. FIG. 7A illustrates an exemplary TDD-UL-DL-Config information element 700. In some examples, TDD-UL-DL-Config information elements are used for determining uplink Time Division Duplex (TDD) configuration and/or downlink TDD configuration. In some examples, TDD-UL-DL-Config information elements are UE-specific. In some examples, TDD-UL-DL-Config information elements are cell specific. In some examples, a TDD-UL-DL-Config information element comprises a referenceSubcarrierSpacing field indicative of a reference subcarrier spacing used to determine time domain boundaries in an uplink-downlink pattern which is common across subcarrier specific carriers (e.g., independent of subcarrier spacing used for data transmission). In some examples, merely values of 15 kHz, 30 kHz and/or 60 kHz (for <6 GHz) and/or values of 60 kHz and/or 120 kHz (for <6 GHz) may be applicable. In some examples, a network configures a reference subcarrier spacing that is not larger than a subcarrier spacing of configured BWPs for a serving cell.

FIG. 7B illustrates an exemplary SlotFormatCombinationsPerCell information element 725. In some examples, a SlotFormatCombinationsPerCell information element is used for configuring SlotFormatCombinations applicable for a serving cell. In some examples, a SlotFormatCombinationsPerCell information element corresponds to an L1 parameter 'cell-to-SFI'.

In some examples, a SlotFormatCombination information element comprises a slotFormatCombinationId field comprising an ID used in a DCI payload to dynamically select a SlotFormatCombination (e.g., the slotFormatCombinationId field corresponds to L1 parameter 'SFI-index') and/or a slotFormats field indicative of slot formats that occur in consecutive slots in time domain order.

In some examples, a SlotFormatCombinationsPerCell information element comprises a positionInDU field indicative of a (starting) position (e.g., bit) of the slotFormatCombinationId field (e.g., an SFI-Index) for a serving cell (e.g., servingCellId) within the DCI payload (e.g., the positionInDCI field corresponds to L1 parameter 'SFI-values'), a servingCellId field indicative of an ID of a serving cell for which SlotFormatCombinations are applicable, a slotFormatCombinations field comprising a list with the SlotFormatCombinations where a SlotFormatCombination of the SlotFormatCombinations comprises one or more SlotFormats and/or a total number of SlotFormats in the list does not exceed 512. The term "SFI" as used herein may correspond to a Slot Format Indication and/or a Slot Format Indicator. In some examples, the SlotFormatCombinationsPerCell information element comprises the subcarrierSpacing field indicative of a reference subcarrier spacing for a slot format combination. In some examples, a network configures a value associated with the subcarrierSpacing field that is smaller than or equal to one or more subcarrier spacings of configured BWPs of a serving cell that a command applies to. In some examples, the network configures a value associated with the subcarrierSpacing field that is smaller than or equal to a subcarrier spacing of a serving cell which the UE monitors for SFI indications. In some examples, the subcarrierSpacing field corresponds to L1 parameter 'SFI-scs'.

FIG. 7C illustrates an exemplary SlotFormatIndicator information element 750. In some examples, a SlotFormatIndicator information element is used to configure monitoring a Group Common PDCCH (GC-PDCCH) for SFIs. In some examples, a SlotFormatIndicator information element comprises a dci-PayloadSize field indicative of a total length of a DCI payload scrambled with SFI-RNTI (e.g., the dci-PayloadSize field corresponds to L1 parameter 'SFI-DCI-payload-length'), an sfi-RNTI field indicative of an RNTI used for SFI on a given cell (e.g., the sfi-RNTI field corresponds to L1 parameter 'SFI-RNTI') and/or a slotFormatCombToAddModList field comprising a list of SlotFormatCombinations for serving cells of the UE (e.g., the slotFormatCombToAddModList field corresponds to L1 parameter 'SFI-cell-to-SFI').

R1-1806105 provides information associated with NR and NR-U operation. In LTE operation, Cell Specific Reference Signals (CRSs) are present in downlink subframes and/or can be used for detecting downlink transmission in various LTE Licensed Assisted Access (LAA) scenarios. In NR, CRSs may not be used. Accordingly, CRSs may not be used for detecting downlink transmission in NR-U. R1-1806105 proposes the following options for detecting a downlink transmission in NR-U: PDCCH monitoring, where it may be assumed that monitoring on a full search space and/or blind decodings (BDs) may not be possible and/or efficient when there are multiple starting positions and/or slots defined; PDCCH Demodulation Reference Signal (DMRS)-based detection which may require that a PDCCH DMRS is transmitted via an entire Control-Resource Set (CORESET) at least in the beginning of the downlink transmission; detection of a preamble at the beginning of the downlink transmission, where the preamble may be constructed from CSI-RS, Tracking Reference Signal (TRS), PSS and/or SSS.

NR licensed band operation supports both semi-static and dynamic configuration for SFI. R1-1806105 proposes that it may be beneficial for the following to be supported for NR-U: using semi-statically configured resources for discovery reference signal and/or PRACH resources; conveying dynamic indication of time-varying COT structure using GC-PDCCH. R1-1806105 proposes that dynamic indication of a COT structure may result in the following benefits: enabling usage of Type 2 LBT at the UE; GC-PDCCH can be used to determine a location of a short PUCCH at the beginning of an uplink portion of a COT; providing opportunities for UE power saving, such as no PDCCH monitoring during an uplink portion of the COT; the dynamic indication of the COT structure can be used to aid CSI measurement at the UE; the dynamic indication of the COT structure can be used to detect (and/or validate) downlink transmission detection. R1-1806105 proposes to use NR-U specific GC-PDCCH for dynamic indication of the COT structure. R1-1806105 proposes that GC-PDCCH for SFI defined in NR-Rel-15 may be used as a starting point for further development.

3GPP TS 36.213 V15.1.0 provides information associated with DCI formats. FIG. 8A illustrates a table 800 comprising DCI formats that are supported. The table 800 presents usages of the DCI formats. In some examples, fields defined in the DCI formats are mapped to information bits $a_0$ to $a_{A-1}$. In some examples, a field is mapped in the order in which it appears, including one or more zero-padding bits, if any, with a first field mapped to a lowest order information bit $a_0$ and each successive field mapped to higher order information bits. In some examples, the most significant bit of each field is mapped to a lowest order information bit for that field (e.g., the most significant bit of the first field is mapped to $a_0$).

In some examples, if a number of information bits in a DCI format is less than 12 bits, zeros are appended to the DCI format until a payload size of the DCI format equals 12.

3GPP TS 37.213 V15.0.0 provides information associated with channel access procedure. An eNB operating one or more LAA SCells may perform channel access procedures for accessing one or more channels on which one or more transmissions of the one or more LAA SCells are performed.

An eNB may transmit a transmission comprising PDSCH, PDCCH and/or Enhanced Physical Downlink Control Channel (EPDCCH) on a carrier on which one or more transmissions of one or more LAA SCells are performed, after first sensing a channel to be idle during slot durations of a defer duration $T_d$; and after a counter N is zero in step 4 below. The counter N is adjusted by sensing the channel for one or more additional slot durations according to the steps below.

In some examples, $CW_p$ corresponds to a contention window for a given priority class. In some examples, $CW_{max,p}$ corresponds to a maximum contention window for a given priority class. In some examples, $CW_{min,p}$ corresponds to a minimum contention window for a given priority class. In some examples, $T_{mcot,p}$ corresponds to a maximum COT for a given priority class.

At step 1, set $N=N_{init}$, where $N_{init}$ is a random number uniformly distributed between 0 and $CW_p$, and go to step 4. At step 2, if N>0 and the eNB chooses to decrement the counter, set N=N−1. At step 3, sense the channel for an additional slot duration, and if the additional slot duration is idle, go to step 4; if the additional slot duration is not idle, go to step 5. At step 4, if N=0, stop; if N is not equal to 0, go to step 2. At step 5, sense the channel until either a busy slot is detected within an additional defer duration $T_d$ or slots (e.g., all slots) of the additional defer duration $T_d$ are detected to be idle. At step 6, if the channel is sensed to be idle during all the slot durations of the additional defer duration, go to step 4; else, go to step 5.

If an eNB has not transmitted a transmission including PDSCH, PDCCH and/or EPDCCH on a carrier on which one or more transmissions of one or more LAA SCells are performed after step 4 in the procedure above, the eNB may transmit a transmission including PDSCH, PDCCH and/or EPDCCH on the carrier if the channel is sensed to be idle at least in a slot duration $T_{sl}$ when the eNB is ready to transmit PDSCH, PDCCH and/or EPDCCH and if the channel has been sensed to be idle during slot durations (and/or all slot durations) of a defer duration $T_d$ before this transmission. If the channel has not been sensed to be idle in a slot duration $T_{sl}$ when the eNB first senses the channel after it is ready to transmit and/or or if the channel has been sensed to be not idle during one or more (and/or any) slot durations of a defer duration $T_d$ before an intended transmission, the eNB proceeds to step 1 after sensing the channel to be idle during the slot durations of a defer duration $T_d$.

A defer duration $T_d$ consists of duration $T_f=16$ μs followed by $m_p$ consecutive slot durations, where each slot duration is $T_{sl}=9$ μs, and $T_f$ includes an idle slot duration $T_{sl}$ at a start of $T_f$. A slot duration $T_{sl}$ is considered to be idle if the eNB senses a channel during the slot duration, and the power detected by the eNB for at least 4 μs within the slot duration is less than energy detection threshold $X_{Thresh}$. Otherwise, the slot duration $T_{sl}$ may be considered to be busy.

FIG. 8B illustrates a table 850 associated with channel access priority classes. $CW_p$, where $CW_{min,p} \le CW_p \le CW_{max,p}$, is a contention window. $CW_p$ (e.g., the contention window) may be adjusted. $CW_{min,p}$ and/or $CW_{max,p}$ may be chosen before step 1 of the procedure above. $m_p$, $CW_{min,p}$ and/or $CW_{max,p}$ are based upon a channel access priority class associated with eNB transmission (as shown in the table 850). $X_{Thresh}$ may be adjusted. In some examples, if the eNB transmits one or more discovery signal transmissions (not including PDSCH, PDCCH and/or EPDCCH) when N>0 (in the procedure above), the eNB may not decrement N during one or more slot durations overlapping the one or more discovery signal transmissions. Alternatively and/or additionally, the eNB may not continuously transmit on a carrier on which one or more transmissions of one or more LAA SCells are performed, for a period exceeding $T_{mcot,p}$ (as shown in the table 850). Alternatively and/or additionally, for p=3 and/or p=4, if an absence of any other technology sharing the carrier can be guaranteed on a long term basis (e.g., by level of regulation), $T_{mcot,p}=10$ ms. Alternatively and/or additionally, $T_{mcot,p}=8$ ms.

In some examples, for LAA operation (e.g., LAA operation in one or more regions, such as in Japan), if the eNB has transmitted a transmission after N=0 (in step 4 of the procedure above), the eNB may transmit a next continuous transmission, for a duration of maximum $T_j=4$ ms, after sensing a channel to be idle for at least a sensing interval of $T_{js}=34$ μs and if the total sensing and transmission time is not more than $$1000 \times T_{mcot} + \left| \frac{T_{mcot}}{T_j} - 1 \right| \times T_{js} \ \mu s.$$

$T_{js}$ consists of duration $T_f=16$ μs followed by two slot durations (e.g., $T_{sl}=9$ μs each) and $T_f$ includes an idle slot duration $T_{sl}$ at a start of $T_f$. The channel is considered to be idle for $T_{js}$ if it is sensed to be idle during the during slot durations of $T_{js}$.

In some examples, if a PUSCH transmission indicates COT sharing, an eNB may transmit a transmission including PDCCH but not including PDSCH on a carrier (e.g., the carrier may be the same as a carrier used for the PUSCH transmission) after (e.g., immediately after) sensing a channel to be idle for at least a sensing interval $T_{pdcch}$=25 µs, if the duration of the PDCCH is less than or equal to a length of two OFDM symbols. In some examples, the transmission comprises an Autonomous Uplink Downlink Feedback Indication (AUL-DFI) and/or an uplink grant to the UE from which the PUSCH transmission indicating COT sharing was received. In some examples, $T_{pdcch}$ consists of a duration $T_f$=16 µs immediately followed by one slot duration $T_{sl}$=9 µs and/or $T_f$ includes an idle slot duration $T_{sl}$ at the start of $T_f$. In some examples, the channel is considered to be idle for $T_{pdcch}$ if the channel is sensed to be idle during slot durations of $T_{pdcch}$.

The term "base station" as used in the present disclosure corresponds to a network central unit and/or a network node in NR used to control one or more Transmission/Reception Points (TRPs) associated with one or more cells. In some examples, communication between a base station and one or more TRPs is performed via fronthaul. A base station may be referred to as a central unit, an eNB, a gNB and/or a NodeB.

The term "TRP" as used in the present disclosure corresponds to a transmission and reception point providing network coverage and/or directly communicating with UEs. A TRP may be referred to as a distributed unit and/or a network node.

The term "cell" as used in the present disclosure corresponds to a cell composed of one or more TRPs. In some examples, coverage of the cell is composed of coverage of the one or more TRPs (e.g., coverage of the cell is composed of coverage of all TRPs associated with the cell). In some examples, the cell is controlled by a BS. In some examples, a cell may be referred to as a TRP group (TRPG).

The term "DCI format 2_0" as used in the present disclosure may refer to an SFI related DCI.

In some examples, in LTE LAA, LTE Enhanced LAA (eLAA) and/or Further Enhanced LAA (FeLAA), a wireless node successfully performs a channel access procedure and/or an LBT scheme before initiating a transmission. In some examples, successfully performing a channel access procedure and/or an LBT scheme enables the wireless node to transmit for a time period (e.g., a period of time). For example, after successfully performing the channel access procedure and/or the LBT scheme, the wireless node is allowed to transmit for the time period. In some examples, the time period is based upon a traffic type associated with the wireless node and/or transmission by the wireless node. In some examples, the time period is based upon a Maximum Channel Occupancy Time (MCOT). In some examples, the MCOT corresponds to a maximum length limit (and/or a maximum time limit) for transmission by the wireless node (e.g., the wireless node may be allowed to perform a transmission during a time period associated with the MCOT). In some examples, the MCOT is associated with the traffic type. In some examples, after successfully performing the channel access procedure and/or the LBT scheme, the wireless node performs one or more transmissions during a COT (e.g., the one or more transmissions performed during the COT may be similar to licensed band operation). In some examples, the COT corresponds to a portion of the MCOT. In some examples, a duration of the COT is less than or equal to a duration of the MCOT.

In some examples, a network node associated with NR-U indicates, via semi-static signaling and/or dynamic signaling, one or more slot formats and/or one or more transmission directions (e.g., uplink, downlink and/or flexible) of one or more slots and/or one or more OFDM symbols. In some examples, the dynamic signaling is a group common signaling and/or a unicast signaling. In some examples, the dynamic signaling corresponds to a DCI format 2_0.

However, in NR-U operation, instances occur where a base station (e.g., a gNB) indicates one or more slot formats of one or more slots, via a DCI format 2_0, where the one or more slots are not aligned with a COT of a network or a base station. In some examples, the one or more slots being aligned with the COT of the network corresponds to an end of the one or more slots being aligned with the ending position of the COT of the network. For example, if the one or more slots are not aligned with the COT of the network, a portion of a slot of the one or more slots may correspond to a time after the ending position of the COT.

In some examples, the base station may indicate one or more slot formats of one or more slots (to a UE) outside the COT of the network. In some examples, a reference subcarrier spacing configuration of $\mu_{SFI}$ by higher layer parameter subcarrierSpacing may be used for deriving each slot format in a combination of slot formats indicated by a SFI-index field value in DCI format 2_0. Each slot format in the combination of slot formats indicated by the SFI-index field value in DCI format 2_0 is applicable to $2^{(\mu-\mu_{SFI})}$ consecutive slots in an active BWP. Accordingly, if a subcarrier spacing configuration of the active BWP (i.e., $\mu$) is different from the reference subcarrier spacing (i.e., $\mu_{SFI}$), a state of one reference symbol indicated in a slot format (directly) corresponds to a number of state of actual symbols. Hence, it may be difficult for the base station to indicate a slot format to be aligned with the ending OFDM symbol of the COT of the network and/or aligned with the ending slot of the COT of the network. In some examples, if a UE receives a DCI format 2_0 indicative of one or more slot formats for one or more slots with a length longer than the COT of the network, the UE may perform incorrect measurements and/or the UE may consume unnecessary power for reception of a signal outside the COT of the network.

In some examples, a UE detects a COT. In some examples, one or more slot formats of one or more slots associated with the COT may be indicated by a DCI format 2_0 (e.g., the one or more slots may be within and/or aligned with the COT). In some examples, the DCI format 2_0 is received before the COT. Alternatively and/or additionally, the DCI format 2_0 may be received within a second COT, before the COT. In some examples, the DCI format 2_0 is indicative of the one or more slot formats of the one or more slots associated with the COT. In existing systems, UE operations (to be performed by the UE) in association with the one or more slots associated with the COT are not defined. In existing systems, interpretation of the one or more slots by the UE is not defined. Further, in existing systems, UE operations to be performed by a UE, based upon a dynamic signaling indicative of one or more slot formats of one or more slots outside a COT, are not defined.

Various techniques are provided herein for a UE to determine slot formats of slots.

In some examples, a UE receives an SFI for a serving cell. In some examples, the SFI is indicative of one or more slot formats, one or more transmission directions (e.g., uplink, downlink and/or flexible) and/or one or more functionalities of one or more slots of the serving cell. In some examples, the SFI is transmitted on an unlicensed cell. In some examples, the serving cell operates and/or is located in an unlicensed spectrum. In some examples, the serving cell may be an unlicensed cell. In some examples, the SFI comprises a slot format combination indicative of one or more slot format values for the serving cell.

In some examples, if a slot and/or an OFDM symbol of the serving cell, indicated by the SFI, is within a time period, the UE applies the SFI (and/or a portion of the SFI) for the slot and/or the OFDM symbol (e.g., the UE may determine a transmission direction and/or a functionality of the slot and/or the OFDM symbol based upon the SFI and/or the portion of the SFI). In some examples, the time period may correspond to a COT of the serving cell. Alternatively and/or additionally, the UE may consider that the time period is the COT of the serving cell.

In some examples, a slot and/or an OFDM symbol may be within a time period if a time corresponding to the slot and/or the OFDM symbol is within the time period (e.g., the time corresponding to the slot and/or the OFDM symbol is inside the time period and/or the time corresponding to the slot and/or the OFDM symbol overlaps with the time period).

In some examples, a slot and/or a OFDM symbol may be outside a time period if the slot and/or the OFDM symbol is not within the time period (e.g., a time corresponding to the slot and/or the OFDM symbol is not within the time period, the time corresponding to the slot and/or the OFDM symbol is not inside the time period and/or the time corresponding to the slot and/or the OFDM symbol does not overlap with the time period).

In some examples, if a slot and/or an OFDM symbol of the serving cell, indicated by the SFI, is within a time period, the UE determines (and/or considers and/or assumes) a slot format of the slot and/or the OFDM symbol based upon the SFI (and/or a portion of the SFI) (e.g., the UE may determine the slot format of the slot and/or the OFDM symbol based upon the SFI and/or the portion of the SFI). In some examples, the time period may correspond to a COT of the serving cell. Alternatively and/or additionally, the UE may consider that the time period is the COT of the serving cell.

In some examples, if a slot and/or an OFDM symbol of the serving cell, indicated by the SFI, is outside a time period, the UE does not apply the SFI (and/or a portion of the SFI) for the slot and/or the OFDM symbol (e.g., the UE may not determine a transmission direction and/or a functionality of the slot and/or the OFDM symbol based upon the SFI and/or the portion of the SFI). In some examples, the time period may correspond to a COT of the serving cell. Alternatively and/or additionally, the UE may consider that the time period is the COT of the serving cell.

In some examples, if a slot and/or an OFDM symbol of the serving cell, indicated by the SFI, is outside a time period, the UE performs one or more actions (e.g., one or more behaviors). In some examples, the time period may correspond to a COT of the serving cell. Alternatively and/or additionally, the UE may consider that the time period is a COT.

In some examples, the one or more actions comprises the UE discarding the SFI (e.g., the UE may discard the SFI responsive to determining and/or considering that the slot and/or the OFDM symbol are not within the time period).

In some examples, the one or more actions comprises the UE ignoring the SFI (e.g., the UE may ignore the SFI responsive to determining and/or considering that the slot and/or the OFDM symbol are not within the time period).

In some examples, the one or more actions comprises the UE discarding and/or ignoring one or more slot format values in the SFI (e.g., the UE may discard and/or ignore the one or more slot format values in the SFI responsive to determining and/or considering that the slot and/or the OFDM symbol are not within the time period). In some examples, the one or more slot format values correspond to the serving cell (e.g., the one or more slot format values apply for the serving cell). In some examples, the one or more slot format values are associated with one or more slot formats of one or more slots and/or one or more OFDM symbols outside the time period. In some examples, the one or more slot format values are indicative of the one or more slot formats of the one or more slots and/or the one or more OFDM symbols outside the time period.

In some examples, the one or more actions comprises the UE storing and/or buffering the SFI until a next SFI monitoring occasion (e.g., a next available SFI monitoring occasion).

In some examples, the one or more actions comprises the UE storing and/or buffering the SFI until the UE receives a channel indicator or an indication of a channel occupancy.

In some examples, the one or more actions comprises the UE storing and/or buffering the SFI until the UE detects a channel occupancy.

In some examples, the one or more actions comprises the UE applying the SFI (that is stored and/or buffered) if the UE receives a channel indicator that indicates the SFI is available. In some examples, the one or more actions comprises the UE applying the SFI (that is stored and/or buffered) responsive to the UE receiving the channel indicator that indicates the SFI is available. In some examples, the UE does not apply the SFI for the serving cell before the UE receives the channel indicator.

In some examples, the UE determines (and/or considers and/or assumes) one or more slot formats of one or more slots within a COT based upon an SFI related DCI (e.g., a DCI format 2_0) received within a channel occupancy.

In some examples, a channel indicator is used for indicating a channel occupancy and/or a COT. In some examples, the channel indicator is indicative of the channel occupancy and/or the COT.

In some examples, an available SFI monitoring occasion corresponds to an SFI monitoring occasion within a COT.

Embodiment 1: In an embodiment, a UE receives an SFI for a serving cell in an unlicensed spectrum. In some examples, the SFI is indicative of one or more slot formats, one or more transmission directions (e.g., uplink, downlink and/or flexible) and/or one or more functionalities of one or more slots in the serving cell. In some examples, the SFI is indicative of one or more transmission directions and/or one or more functionalities of one or more OFDM symbols in the serving cell. In some examples, the serving cell may be an unlicensed cell.

In some examples, if a slot or an OFDM symbol of the serving cell indicated by the SFI is outside a time period (e.g. a COT of the serving cell, a COT from the UE's view), the UE may sense/detect a channel indicator or a channel occupancy on the slot or on the OFDM symbol.

In some examples, before or until the UE receives and/or detects a channel indicator for the serving cell, the UE assumes that one or more slot formats, one or more transmission directions and/or one or more functionalities of one or more slots and/or one or more OFDM symbols is flexible. In some examples, the one or more slots and/or the one or more OFDM symbols correspond to a time (and/or are identified) before the UE receives and/or detects the channel indicator for the serving cell.

In some examples, the UE assumes that one or more slot formats, one or more transmission directions and/or one or more functionalities of one or more slots and/or one or more OFDM symbols is flexible, wherein one or more slots and/or one or more OFDM symbols are located after the end of a COT of a network and/or the UE in the (unlicensed) serving cell and until the UE receives and/or detects a channel indicator for the serving cell.

In some examples, if a slot format value in the SFI is associated with a slot outside a time period, the UE does not perform configured physical channel reception and/or reference signal reception based upon the slot format value. In some examples, if a slot format value in the SFI is associated with a slot outside a time period, the UE does not perform configured physical channel reception and/or reference signal reception in the slot, based upon the slot format value.

In some examples, if a slot format value in the SFI is associated with a slot, for a subcarrier spacing in downlink active BWP, outside a time period, the UE does not perform configured physical channel reception and/or reference signal reception in the slot, based upon the slot format value.

In some examples, a slot for a subcarrier spacing in downlink active BWP is a slot having a length that is determined based upon the subcarrier spacing in downlink active BWP.

In some examples, the UE does not perform configured physical channel reception and/or reference signal reception, based upon the SFI, in a flexible symbol outside of a time period.

In some examples, the UE does not perform configured physical channel reception and/or reference signal reception, based upon the SFI, in a flexible symbol outside of a time period, (except for performing monitoring for a channel indicator for the serving cell). For example, the UE may monitor for the channel indicator for the serving cell in the flexible symbol outside of the time period.

In some examples, the UE does not perform configured physical channel transmission and/or reference signal transmission, based upon the SFI, in a flexible symbol outside of a time period. In some examples, the UE does not perform configured physical channel reception and/or reference signal reception, based upon the SFI, in a flexible symbol that is after (an end of) a COT from a network or the UE in the (unlicensed) serving cell and before the UE receives and/or detects a channel indicator for the serving cell, (except for performing monitoring for a channel indicator for the serving cell). In some examples, the flexible symbol corresponds to a time that is after (the end of) the COT and/or before the UE receives and/or detects a channel indicator for the serving cell.

In some examples, the UE does not perform configured physical channel transmission and/or reference signal transmission, based upon the SFI, in a flexible symbol that is after (an end of) a COT from a network or the UE in the (unlicensed) serving cell and before the UE receives and/or detects a channel indicator for the serving cell. In some examples, the flexible symbol corresponds to a time that is after (the end of) the COT and/or before the UE receives and/or detects the channel indicator for the serving cell.

In some examples, if a slot and/or an OFDM symbol of the serving cell, indicated by the SFI, is outside a time period, the UE performs one or more actions (e.g., one or more behaviors).

In some examples, the one or more actions comprises the UE discarding or ignoring one or more slot format values in the SFI (e.g., the UE may discard the one or more slot format values in the SFI if the UE determines and/or considers that the slot and/or the OFDM symbol are not within the time period). In some examples, the one or more slot format values are associated with the slot and/or the OFDM symbol.

In some examples, the one or more actions comprises the UE discarding or ignoring one or more slot format values in the SFI (e.g., the UE may discard the one or more slot format values in the SFI if the UE does not receive and/or detect a channel indicator). In some examples, the one or more slot format values are associated with the slot and/or the OFDM symbol.

In some examples, the one or more actions comprises the UE discarding and/or ignoring the SFI (e.g., the UE may discard the SFI responsive to determining and/or considering that the slot and/or the OFDM symbol are not within the time period).

In some examples, the one or more actions comprises the UE storing and/or buffering the SFI until a next SFI monitoring occasion (e.g., a next available SFI monitoring occasion).

In some examples, the one or more actions comprises the UE storing and/or buffering the SFI until the UE receives a channel indicator for the serving cell.

In some examples, the one or more actions comprises the UE storing and/or buffering the SFI until the UE detects a channel occupancy for the serving cell.

In some examples, the one or more actions comprises the UE storing and/or buffering the SFI until the UE receives an indication of a channel occupancy for the serving cell.

In some examples, the one or more actions comprises the UE applying the SFI (that is stored and/or buffered) from a beginning of a second slot and/or a second OFDM symbol and/or the UE may continue to apply the SFI (for one or more other slots and/or one or more other OFDM symbols) after the second slot and/or the second OFDM symbol), wherein the UE receives (from a network) a channel indicator for the serving cell in the second slot and/or the second OFDM symbol.

In some examples, the one or more actions comprises the UE applying the SFI (that is stored and/or buffered) from a beginning of a second slot and/or a second OFDM symbol and/or the UE may continue to apply the SFI (for one or more other slots and/or one or more other OFDM symbols) after the second slot and/or the second OFDM symbol), wherein the UE detects a channel occupancy for the serving cell in the second slot and/or the second OFDM symbol.

In some examples, the one or more actions comprises the UE applying the SFI (that is stored and/or buffered) from (a time during) a second slot and/or a second OFDM symbol and/or the UE may continue to apply the SFI (for one or more other slots and/or one or more other OFDM symbols) after (the time during) the second slot and/or the second OFDM symbol), wherein the UE detects a channel occupancy for the serving cell in the second slot and/or the second OFDM symbol.

In some examples, the one or more actions comprises the UE applying the SFI (that is stored and/or buffered) from (a time during) a second slot and/or a second OFDM symbol and/or the UE may continue to apply the SFI (for one or more other slots and/or one or more other OFDM symbols) after (the time during) the second slot and/or the second OFDM symbol), wherein the UE receives (from a network) an indication of a channel occupancy for the serving cell in the second slot and/or the second OFDM symbol.

In some examples, the one or more actions are performed by the UE based upon a channel indicator for the serving cell. For example, whether the UE applies the SFI (that is stored and/or buffered) may be determined based upon the channel indicator. Alternatively and/or additionally, whether the UE applies the SFI (that is stored and/or buffered) may be determined based upon the channel indicator if the channel indicator is received before (a time corresponding to) an end of a second slot associated with (e.g., defined by) a last slot format value in the SFI. In some examples, "last slot format value" as used herein corresponds to a last slot format value in the SFI, with respect to an order of slot format values in the SFI (e.g., the order of slot format values in the SFI may be associated with a time-order of slots that slot format values of the SFI are associated with). In some examples, "last slot" as used herein corresponds to a last slot of a plurality of slots with respect to an order of slots of the plurality of slots (e.g., the last slot corresponds to a time that is after one or more times of one or more other slots of the plurality of slots).

In some examples, the one or more actions comprises the UE applying the SFI (that is stored and/or buffered) if a channel indicator for the serving cell is received and/or detected before (a time corresponding to) an end of a second slot associated with (e.g., defined by) a last slot format value in the SFI.

In some examples, the one or more actions comprises the UE applying the SFI (that is stored and/or buffered) if a channel occupancy for the serving cell is detected and/or an indication of the channel occupancy is received from a network before (a time corresponding to) an end of a second slot associated with (e.g., defined by) a last slot format value in the SFI.

In some examples, if the UE stores and/or buffers the SFI, the UE may assume (and/or determine and/or consider) that one or more slot formats, one or more transmission directions and/or one or more functionalities of one or more slots and/or one or more OFDM symbols are flexible.

In some examples, if the UE stores and/or buffers the SFI, the UE may assume (and/or determine and/or consider) that one or more slot formats, one or more transmission directions and/or one or more functionalities of one or more slots and/or one or more OFDM symbols are flexible, where the one or more slots and/or the one or more OFDM symbols correspond to a time before the UE receives and/or detects a channel indicator for the serving cell (e.g., the one or more slots and/or the one or more OFDM symbols may correspond to one or more times that are before a time that the UE receives and/or detects the channel indicator for the serving cell).

In some examples, if the UE stores and/or buffers the SFI, the UE does not perform configured physical channel reception and/or reference signal reception on a second slot associated with (e.g., defined by) a slot format value in the SFI.

In some examples, if the UE stores and/or buffers the SFI, the UE does not perform configured physical channel reception and/or reference signal reception, based upon the SFI, on a second slot outside the time period.

In some examples, if the UE stores and/or buffers the SFI, the UE does not perform configured physical channel reception and/or reference signal reception, based upon the SFI, on a second slot outside the time period, except for monitoring for a channel indicator for the serving cell.

In some examples, the one or more actions comprises the UE not applying the SFI (that is stored and/or buffered) if a channel indicator for the serving cell is not received and/or detected and/or if a channel occupancy for the serving cell is not detected and/or an indication of the channel occupancy is not received from a network before (a time corresponding to) an end of a second slot associated with (e.g., defined by) a last slot format value in the SFI.

In some examples, the one or more actions comprises the UE applying the SFI (that is stored and/or buffered) before (a time corresponding to) an end of a second slot associated with (e.g., defined by) a last slot format value in the SFI, if a channel indicator for the serving cell is received and/or detected and/or if the channel indicator is indicates that the SFI is available.

In some examples, the one or more actions comprises the UE applying the SFI (that is stored and/or buffered) if a channel indicator for the serving cell is received and/or detected after receiving the SFI and/or before (a time corresponding to) an end of a second slot associated with (e.g., defined by) a last slot format value in the SFI and/or if the channel indicator is indicates that the SFI is available.

In some examples, the UE performing the one or more actions comprises the UE not applying the SFI (that is stored and/or buffered) if a channel indicator for the serving cell is received and/or detected before (a time corresponding to) an end of a second slot associated with (e.g., defined by) a last slot format value in the SFI and/or if the channel indicator is indicates that the SFI is not available.

In some examples, the one or more actions comprises the UE not applying the SFI (that is stored and/or buffered), if a channel indicator for the serving cell is not received and/or detected after receiving the SFI and/or before (a time corresponding to) an end of a second slot associated with (e.g., defined by) a last slot format value in the SFI and/or if the channel indicator is indicates that the SFI is not available.

In some examples or above mentioned examples, if there are multiple slots associated with (e.g., defined by) the last slot format value in the SFI, the second slot may correspond to a last slot of the multiple slots.

In some examples, the UE does not apply the SFI for the serving cell before receiving a channel indicator for the serving cell.

In some examples, the UE does not apply slot format value 255 (and/or a slot format corresponding to the slot format value 255) for one or more slots, in the serving cell, corresponding to one or more times before the UE receives a channel indicator for the serving cell.

In some examples, the UE applies slot format value 255 (and/or a slot format corresponding to the slot format value 255) for one or more slots, in the serving cell, corresponding to one or more times after the UE receives a channel indicator for the serving cell.

In some examples, the UE applies slot format value 255 (and/or a slot format corresponding to the slot format value 255) for a slot in the serving cell if (and/or after) the UE receives a channel indicator for the serving cell.

In some examples, if the UE does not apply the SFI (that is stored and/or buffered), the UE assumes that one or more slot formats, one or more transmission directions and/or one or more functionalities of one or more slots and/or one or more OFDM symbols is flexible. In some examples, the one or more slots and/or the one or more OFDM symbols correspond to a time before the UE receives and/or detects a channel indicator for the serving cell. For example, the one or more slots and/or the one or more OFDM symbols may correspond to one or more times before (a time that) the UE receives and/or detects the channel indicator for the serving cell.

In some examples, if the UE does not apply a slot format value in the SFI (that is stored and/or buffered), the UE does not perform configured physical channel reception and/or reference signal reception on a slot associated with (e.g., defined by) the slot format value.

In some examples, if the UE does not apply the SFI (that is stored and/or buffered), the UE does not perform configured physical channel reception and/or reference signal reception outside the time period (e.g., the UE may not perform configured physical channel reception and/or reference signal reception on a flexible symbol corresponding to a time that is outside of the time period).

In some examples, if the UE does not apply the SFI (that is stored and/or buffered), the UE does not perform configured physical channel reception and/or reference signal reception outside the time period, except for monitoring for a channel indicator for the serving cell (e.g., the UE may monitor for the channel indicator for the serving cell outside the time period).

In some examples, the UE applying the SFI for a slot corresponds to the UE determining (and/or considering and/or assuming) a slot format of the slot based upon the SFI. For example, if the UE applies the SFI for a slot, the UE determines (and/or considers and/or assumes) a slot format (and/or a transmission direction and/or a functionality) of the slot based upon the SFI.

In an example, an SFI related DCI (e.g., a DCI format 2_0) is indicative of one or more slot formats for slot #n through slot #n+7 (e.g., if #n is 10, the SFI related DCI is indicative of one or more slot formats for slot 10, slot 11, slot 12, slot 13, slot 14, slot 15, slot 16 and slot 17). In other words, if slot #n is with (logical) slot index "10", slot #n+1 is with (logical) slot index "11". In some examples, the UE applying the SFI for slot #n+5 corresponds to the UE determining (and/or considering and/or assuming) a slot format of the slot #n+5 based upon an indication of the slot format of the slot #n+5 in the SFI related DCI.

In some examples, if the UE does not apply the SFI for a slot, the UE may determine (and/or consider and/or assume) a slot format (and/or a transmission direction and/or a functionality) of the slot based upon the SFI.

In some examples, the UE may determine (and/or consider and/or assume) one or more slot formats of one or more slots within a channel occupancy based upon an SFI related DCI (e.g., DCI format 2_0) received within the channel occupancy (and/or a different channel occupancy).

In an example, the UE receives a DCI format 2_0 (and/or a different type of SFI related DCI) in slot #n. The DCI format 2_0 may be indicative of one or more slot formats associated with 10 slots. A first channel occupancy may be associated with slots from slot #n through slot #n+3 and/or a second channel occupancy may be associated with slots from slot #n+7 through slot #n+11. Accordingly, slots from slot #n+4 through slot #n+6 are outside of a channel occupancy. The slots from slot #n+4 through slot #n+6 being outside of a channel occupancy may correspond to the slots from slot #n+4 through slot #n+6 not being associated with and/or not being within any channel occupancy (such as the first channel occupancy and/or the second channel occupancy).

In the example, a subcarrier spacing for a downlink BWP of the UE may be the same as a reference subcarrier spacing configured to the UE. In some examples, the DCI format 2_0 may be indicative of 10 slot format values (and/or a different amount of slot format values). In some examples, if the UE applies the DCI format 2_0 for the second channel occupancy, the UE may apply slot format values from the eighth slot format value through the tenth slot format value, of the 10 slot format values, for the second channel occupancy. For example, if the UE applies the DCI format 2_0 for the second channel occupancy, the UE may apply slot format values from the fifth slot format value through the ninth slot format value, of the 10 slot format values, for the second channel occupancy. For example, the UE may apply slot format values from the first slot format value through the fourth slot format value, of the 10 slot format values, for the first channel occupancy, and/or the UE may apply the slot format values from the eighth slot format value through the tenth/last slot format value, of the 10 slot format values, for the second channel occupancy. For example, the eighth slot format value of the 10 slot format values may be applied for slot #n+7 of the second channel occupancy, the ninth slot format value of the 10 slot format values may be applied for slot #n+8 of the second channel occupancy and/or the tenth slot format value of the 10 slot format values may be applied for slot #n+9 of the second channel occupancy.

In some examples, the slot format values from the fifth slot format value through the ninth slot format value may be applied for the slots, associated with the second channel occupancy, from slot #n+7 to slot #n+11.

In the example, the subcarrier spacing for the downlink BWP of the UE may be different than the reference subcarrier spacing configured to the UE, such as the subcarrier spacing for the downlink BWP is 30 kHz and/or the reference subcarrier spacing is 15 kHz. In some examples, the DCI format 2_0 may be indicative of 5 slot format values (and/or a different amount of slot format values). In some examples, a slot format value of the 5 slot format values may be indicative of one or more slot formats for two 30 kHz subcarrier spacing slots.

In some examples, if the UE applies the DCI format 2_0 for the second channel occupancy, the UE may apply slot format values from the fourth slot format value through the fifth slot format value, of the 5 slot format values, for the second channel occupancy. For example, a fourth slot format value of the 5 slot format values may be indicative of a slot format of slot #n+7 of the second channel occupancy and/or a fifth slot format value of the 5 slot format values may be indicative of a slot format of slot #n+8 and a slot format of slot #n+9 of the second channel occupancy.

Alternatively and/or additionally, if the UE applies the DCI format 2_0 for the second channel occupancy, the UE may apply slot format values from the third slot format value through the fifth slot format value, of the 5 slot format values, for the second channel occupancy. For example, a third slot format value of the 5 slot format values may be indicative of a slot format of slot #n+7 and a slot format of slot #n+8 of the second channel occupancy, the fourth slot format value of the 5 slot format values may be indicative of a slot format of slot #n+9 and a slot format of slot #n+10 of the second channel occupancy and/or the fifth slot format value of the 5 slot format values may be indicative of a slot format of slot #n+11 of the second channel occupancy.

Alternatively and/or additionally, if the UE applies the DCI format 2_0 for the second channel occupancy, the UE may apply slot format values from the first slot format value through the third slot format value, of the 5 slot format values, for the second channel occupancy. For example, a first slot format value of the 5 slot format values may be indicative of a slot format of slot #n+7 and a slot format of slot #n+8 of the second channel occupancy, a second slot format value of the 5 slot format values may be indicative of a slot format of slot #n+9 and a slot format of slot #n+10 of the second channel occupancy and/or the third slot format value of the 5 slot format values may be indicative of a slot format of slot #n+11 of the second channel occupancy.

Figure 9A:
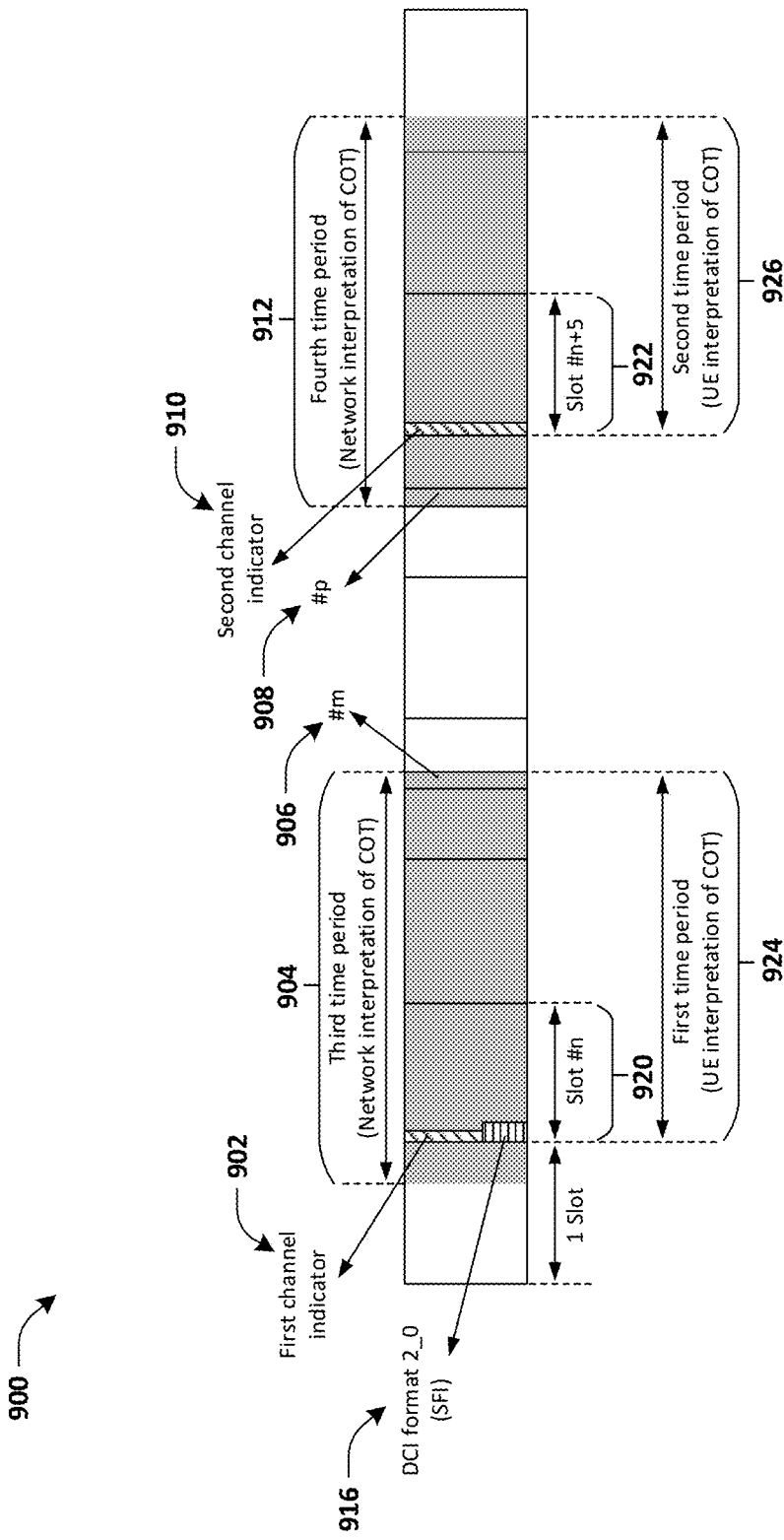
FIG. 9A illustrates an exemplary scenario associated with slot formats of slots.
Figure 9B:
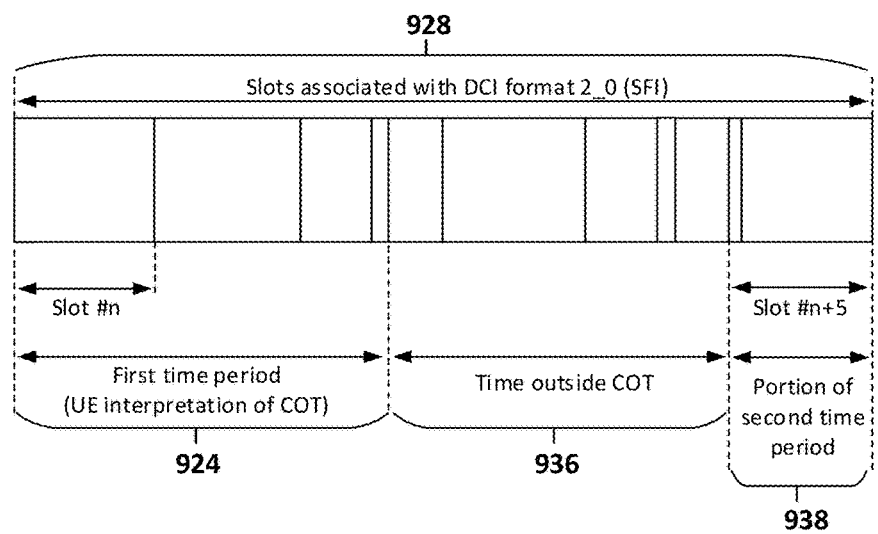
FIG. 9B illustrates a representation of slots associated with a Slot Format Indication (SFI) related DCI associated with the exemplary scenario of FIG. 9A.

FIGS. 9A-9B illustrate an exemplary scenario 900 associated with slot formats of slots. FIG. 9A illustrates a representation of the exemplary scenario 900. In some examples, an SFI related DCI 916 (e.g., a DCI format 2_0) is received, by a UE, within a slot #n 920. For example, the SFI related DCI 916 may be received during a beginning portion of the slot #n 920. In some examples, a first channel indicator 902 is received by the UE within the slot #n 920. For example, the first channel indicator 902 may be received during a beginning portion of the slot #n 920.

In some examples, a first time period 924 may be associated with a first COT. For example, the UE may determine (and/or assume and/or consider) that the first COT corresponds to the first time period 924. In some examples, the first COT is associated with a network. In some examples, the first time period 924 begins at a time that the first channel indicator 902 is received by the UE. Alternatively and/or additionally, the UE may determine (and/or be aware) that the first time period 924 and/or the first COT ends in association with an OFDM symbol #m 906 in slot #n+2 (e.g., the UE may determine (and/or be aware) that an ending position of the first time period 924 and/or the first COT is at the OFDM symbol #m 906 in the slot #n+2). In some examples, the first time period 924 may comprise at least a portion of the slot #n 920, slot #n+1 (following the slot #n 920) and/or a portion of the slot #n+2 (following the slot #n+1). Alternatively and/or additionally, the first time period 924 may range from a beginning of the slot #n 920 (where the UE receives the first channel indicator 902) to an ending symbol. The ending symbol corresponds to the OFDM symbol #m 906 of the slot #n+2.

In some examples, a second channel indicator 910 is received by the UE within a slot #n+5 922. For example, the first channel indicator 902 may be received during a beginning portion of the slot #n+5 922.

In some examples, a second time period 926 may be associated with a second COT. For example, the UE may determine (and/or assume and/or consider) that the second COT corresponds to the second time period 926. In some examples, the second COT is associated with the network. In some examples, the second time period 926 begins at a time that the second channel indicator 910 is received by the UE. In some examples, the second time period 926 may comprise at least a portion of the slot #n+5 922, slot #n+6 (following the slot #n+5 922) and/or a portion of slot #n+7 (following the slot #n+6). Alternatively and/or additionally, the second time period 926 may range from a beginning of the slot #n+5 922 (where the UE receives the second channel indicator 910) to an ending symbol of the slot #n+7.

In some examples, the first time period 924 may correspond to an interpretation, by the UE, of the first COT (e.g., the first time period 924 may correspond to a version of the first COT from the UE's view). For example, the UE may consider and/or assume that the first time period 924 corresponds to the first COT. In some examples, a third time period 904 may be associated with the first COT. For example, the network may determine (and/or consider and/or assume) that the first COT corresponds to the third time period 904. In some examples, the third time period 904 may correspond to an interpretation, by the network, of the first COT (e.g., the third time period 904 may correspond to a version of the first COT from the network's view). The third time period 904 may comprise a portion of a slot preceding the slot #n 920.

In some examples, the second time period 926 may correspond to an interpretation, by the UE, of the second COT (e.g., the second time period 926 may correspond to a version of the second COT from the UE's view). For example, the UE may consider and/or assume that the second time period 926 corresponds to the second COT. In some examples, a fourth time period 912 may be associated with the second COT. For example, the network may determine (and/or consider and/or assume) that the second COT corresponds to the fourth time period 912. In some examples, the fourth time period 912 may correspond to an interpretation, by the network, of the second COT (e.g., the fourth time period 912 may correspond to a version of the second COT from the network's view). The fourth time period 912 may comprise a portion of a slot #n+4 preceding the slot #n+5 922, wherein the portion of the slot #n+4 may comprise a symbol #p 908 of the slot #n+4 and/or one or more symbols of the slot #n+4 following the symbol #p 908 of the slot #n+4.

FIG. 9B illustrates a representation of slots associated with the SFI related DCI 916 (e.g., the DCI format 2_0). In some examples, the SFI related DCI 916 is indicative of one or more slot formats associated with 6 slots 928. For example, the 6 slots 928 may be associated with the first time period 924, a time outside a COT 936 and/or a portion of the second time period 938. In some examples, the portion of the second time period 938 comprises the slot #n+5 922.

In some examples, the UE determines (and/or considers and/or assumes) one or more slot formats associated with the first time period 924 based upon the SFI related DCI 916 (e.g., the DCI format 2_0). In some examples, the UE determines (and/or considers and/or assumes) one or more slot formats associated with slots within the first time period 924 based upon the SFI related DCI 916 (e.g., the SFI related DCI 916 may be indicative of one or more slot formats associated with the slot #n 920, the slot #n+1 and/or the slot #n+2 associated with the first time period 924). In some examples, the SFI related DCI 916 (and/or one or more slot formats indicated by the SFI related DCI 916) may be used and/or applied for merely a portion of OFDM symbols in the slot #n+2. In some examples, the portion of OFDM symbols in the slot #n+2 corresponds to symbols from symbol #0 through symbol #m of the slot #n+2. For example, the portion of OFDM symbols in the slot #n+2 are comprised within the first time period 924.

In some examples, the UE does not use and/or apply one or more slot formats indicated by the SFI related DCI 916 for one or more slots outside the first time period 924. For example, the UE does not use and/or apply one or more slot formats indicated by the SFI related DCI 916 for the slot #n+3, the slot #n+4 and/or the slot #n+5 922.

In some examples, the UE does not use and/or apply one or more slot formats indicated by the SFI related DCI 916 for one or more slots outside the first time period 924, until the UE receives a different channel indicator (such as the second channel indicator 910).

In some examples, the UE buffers and/or stores one or more slot formats, corresponding to slots outside the first time period 924, indicated by the SFI related DCI 916, until the UE receives a different channel indicator (such as the second channel indicator 910).

In some examples, responsive to receiving the second channel indicator 910, the UE may determine (and/or consider and/or assume) one or more slot formats associated with the second time period 926 based upon the SFI related DCI 916. For example, the UE may determine (and/or consider and/or assume) a slot format associated with the slot #n+5 922 based upon a slot format indicated by the SFI related DCI 916.

In some examples, responsive to receiving the second channel indicator 910, the UE may determine (and/or consider and/or assume) one or more slot formats of one or more slots within the second time period 926 based upon the SFI related DCI 916. For example, the UE may determine (and/or consider and/or assume) a slot format associated with the slot #n+5 922 based upon a slot format indicated by the SFI related DCI 916.

In some examples, the SFI related DCI 916 (and/or one or more slot formats indicated by the SFI related DCI 916) may be not be used and/or applied for OFDM symbols in the slot #n+4. In some examples, the OFDM symbols in the slot #n+4 correspond to symbols from the symbol #p 908 through symbol #13 of the slot #n+4. For example, the OFDM symbols in the slot #n+4 are comprised within the time outside a COT 936 illustrated in FIG. 9B.

In some examples, a channel indicator (e.g., the first channel indicator 902 and/or the second channel indicator 910) is indicative of a beginning of a COT of a network (e.g., the channel indicator indicates starting of the COT of a network). In some examples, the channel indicator is indicative of a beginning of a time period (e.g., the first time period 924 and/or the second time period 926). For example, the channel indicator indicates starting of the time period.

In some examples, the channel indicator is used for indicating a channel occupancy and/or a COT. In some examples, a UE assumes that a COT of the network starts at an OFDM symbol where the channel indicator is received. In some examples, the UE assumes that the OFDM symbol where the channel indicator is received is within the COT. In some examples, the COT of the network may start prior to transmission of the channel indicator by the network.

In some examples, the channel indicator may be a reference signal. Alternatively and/or additionally, the channel indicator may be a DMRS of a CORESET. Alternatively and/or additionally, the channel indicator may be a DMRS of a CORESET on a (single) OFDM symbol. Alternatively and/or additionally, the channel indicator may be a DMRS of a CORESET and/or a partial DMRS of a CORESET. Alternatively and/or additionally, the channel indicator may be a common signal. Alternatively and/or additionally, the channel indicator may be a group common signal.

In some examples, the network transmits the channel indicator if (and/or after) the network occupies a channel (associated with the channel indicator). For example, the network may transmit the channel indicator responsive to the network occupying the channel.

In some examples, the network transmits the channel indicator if (and/or after) the network performs a channel access procedure and/or an LBT scheme successfully. For example, the network may transmit the channel indicator responsive to the network performing the channel access procedure and/or the LBT scheme successfully.

In some examples, if and/or after the UE detects and/or receives the channel indicator, the UE determines that the COT of the network started (and/or is starting). For example, the UE is aware that the COT of the network starts and/or begins if and/or after the UE detects and/or receives the channel indicator. For example, responsive to the UE detecting and/or receiving the channel indicator, the UE is aware that the COT of the network starts and/or begins.

In some examples, if and/or after the UE detects and/or receives the channel indicator, the UE may determine (and/or assume and/or consider) that data transmission and/or data reception (for a duration of time) is similar to data transmission and/or data reception associated with a licensed band and/or a licensed spectrum. For example, responsive to the UE detecting and/or receiving the channel indicator, the UE may determine (and/or assume and/or consider) that data transmission and/or data reception (for a duration of time) is similar to data transmission and/or data reception associated with a licensed band and/or a licensed spectrum.

In some examples, if and/or after the UE detects and/or receives the channel indicator, the UE may determine (and/or assume and/or consider) that one or more slot formats and/or one or more frame structures associated with one or more slots may be determined based upon one or more RRC signalings. For example, responsive to the UE detecting and/or receiving the channel indicator, the UE may determine (and/or assume and/or consider) that the one or more slot formats and/or the one or more frame structures associated with the one or more slots may be determined based upon the one or more RRC signalings.

In some examples, if and/or after the UE detects and/or receives the channel indicator, the UE may determine (and/or assume and/or consider) the one or more slot formats and/or the one or more frame structures associated with the one or more slots based upon the one or more RRC signalings. For example, responsive to the UE detecting and/or receiving the channel indicator, the UE may determine (and/or assume and/or consider) the one or more slot formats and/or the one or more frame structures associated with the one or more slots based upon one or more RRC signalings.

In some examples, the one or more RRC signalings comprise tdd-UL-DL-ConfigurationCommon, tdd-UL-DL-ConfigurationCommon2 and/or tdd-UL-DL-ConfigDedicated.

In some examples, if and/or after the UE detects and/or receives the channel indicator, the UE may perform data transmission and/or data reception (for a duration of time) (similarly to data transmission and/or data reception associated with a licensed band and/or a licensed spectrum). For example, responsive to the UE detecting and/or receiving the channel indicator, the UE may perform data transmission and/or data reception (for a duration of time) (similarly to data transmission and/or data reception associated with a licensed band and/or a licensed spectrum). In some examples, the data transmission may correspond to configured transmission, such as configured grant transmission, grant free transmission, SRS transmission, reporting of one or more configured downlink measurements and/or uplink transmission. In some examples, the data reception may correspond to CORESET monitoring, downlink reference signal measurement, CSI-RS measurement, SS-PBCH block measurement and/or SPS-PDSCH reception.

In some examples, the UE detecting a COT corresponds to the UE determining that the network and/or the UE are (currently) able to perform one or more transmissions (continuously) for a time period (e.g., the COT) after successful performance of a channel access procedure and/or an LBT scheme.

In some examples, a channel occupancy corresponds to a wireless node performing transmission in an unlicensed spectrum and/or an unlicensed channel for a time period after successful performance of a channel access procedure and/or an LBT scheme.

In some examples, the time period corresponds to a COT where the wireless node is able to perform one or more transmissions (continuously). In some examples, the wireless node may perform, within the COT, one or more transmissions without performing a second channel access procedure and/or a second LBT scheme.

In some examples, a UE detecting a channel occupancy and/or a COT corresponds to the UE determining that a network and/or the UE are (currently) able to perform one or more transmissions (continuously) for a time period (e.g., the COT) after successful performance of a channel access procedure and/or an LBT scheme.

In some examples, an available SFI monitoring occasion corresponds to an SFI monitoring occasion within a COT.

In some examples, the COT is obtained by a network. In some examples, the COT is obtained by a UE. In some examples, the COT is obtained by the network and/or the UE.

In some examples, the UE receives a signal. In some examples, the signal is received within a time period. In some examples, the signal is indicative of an ending position and/or an ending slot of the time period and/or an ending OFDM symbol within the ending slot. In some examples, the ending position corresponds to the ending slot and/or the ending OFDM symbol within the ending slot.

In some examples, the ending position of the time period is determined based upon the signal. In some examples, the ending position of the time period is determined based upon a maximum value, an MCOT and/or a COT used for a network after a (successfully performed) channel access procedure and/or an LBT scheme.

In some examples, the network transmits one or more signals to the UE for indicating the ending position of the time period. In some examples, the UE expects that the one or more signals, received on one or more monitoring occasions in the time period, are indicative of the (same) ending position. For example, the UE expects that the one or more signals, received on one or more monitoring occasions in the time period, are indicative of the (same) ending slot and/or the (same) ending OFDM symbol within the ending slot. In some examples, the UE determines the ending position based upon the one or more signals (and/or the signal).

In some examples, after (a time corresponding to) the ending slot, the UE does not receive a configured data channel (and/or the UE does not transmit a configured data channel) until the UE detects a (next) channel occupancy associated with the network, until the UE receives a transmission from the network and/or until the UE (successfully) performs a clear channel assessment and/or an LBT procedure.

In some examples, after (a time corresponding to) the ending slot, the UE does not receive a configured reference signal for channel measurement (and/or the UE does not transmit a configured reference signal for channel measurement) until the UE detects a (next) channel occupancy associated with the network, until the UE receives a transmission from the network and/or until the UE (successfully) performs a clear channel assessment and/or an LBT procedure.

In some examples, after (a time corresponding to) the ending slot, the UE does not monitor and/or detect one or more configured CORESETs until the UE detects a (next) channel occupancy associated with the network, until the UE receives a transmission from the network and/or until the UE (successfully) performs a clear channel assessment and/or an LBT procedure.

In some examples, after (a time corresponding to) the ending slot, the UE does not transmit PRACH on a configured PRACH transmission occasion until the UE detects a (next) channel occupancy associated with the network, until the UE receives a transmission from the network and/or until the UE (successfully) performs a clear channel assessment and/or an LBT procedure.

In some examples, after (a time corresponding to) the ending slot, the UE does not monitor and/or detect one or more configured CORESETs until the UE detects a (next) channel occupancy associated with the network, until the UE receives a transmission from the network and/or until the UE (successfully) performs a clear channel assessment and/or an LBT procedure.

In some examples, an SFI is indicative of a slot combination for a serving cell. In some examples, a slot combination comprises one or more slot format values. In some examples, a slot format value is indicative of a slot format of a slot. In some examples, a slot format value is indicative of a transmission direction, a functionality and/or a state of an OFDM symbol in a slot. In some examples, a slot format value is indicative of a transmission direction, a functionality and/or a state of each OFDM symbol of a plurality of OFDM symbols in a slot. In some examples, an SFI is indicated by a DCI (e.g., an SFI related DCI). In some examples, the DCI is a DCI format 2_0.

In some examples or above mentioned examples, a time period may correspond to a COT of the serving cell. Alternatively and/or additionally, the UE may consider that the time period is the COT of the serving cell.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented simultaneously.

Figure 10:
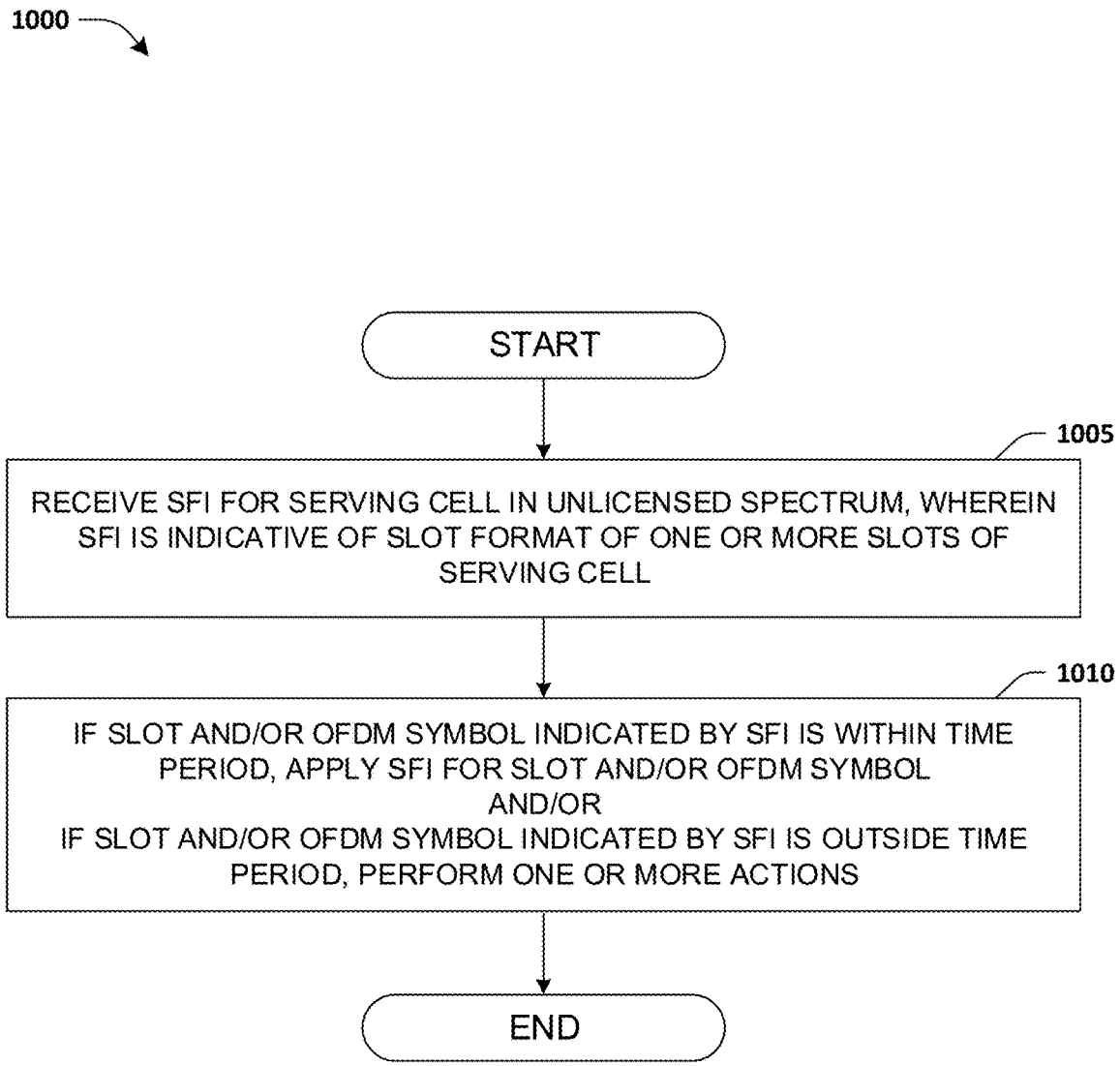
FIG. 10 is a flow chart according to one exemplary embodiment.

FIG. 10 is a flow chart 1000 according to one exemplary embodiment from the perspective of a UE. In step 1005, the UE receives an SFI for a serving cell in an unlicensed spectrum, wherein the SFI is indicative of a slot format of one or more slots of the serving cell. In step 1010, if a slot and/or an OFDM symbol indicated by the SFI is within a time period, the UE applies the SFI (and/or a portion of the SFI) for the slot and/or the OFDM symbol. Alternatively and/or additionally, if a slot and/or an OFDM symbol indicated by the SFI is outside the time period, the UE performs one or more actions.

In the context of the embodiment illustrated in FIG. 10 and discussed above, the time period may correspond to a COT. Alternatively and/or additionally, the time period may correspond to a time period that the UE determines (and/or assumes and/or considers) is the COT.

In some examples, the SFI is transmitted on the serving cell (e.g., the SFI may be received by the UE via the serving cell). In some examples, the SFI is indicative of one or more transmission directions and/or one or more functionalities of one or more OFDM symbols.

In some examples, if a slot and/or an OFDM symbol indicated by the SFI is within the time period, the UE determines (and/or considers and/or assumes) a slot format of the slot and/or the OFDM symbol based upon the SFI (and/or a portion of the SFI corresponding to the slot and/or the OFDM symbol).

In some examples, if a slot and/or an OFDM symbol indicated by the SFI is outside the time period, the UE does not apply the SFI for the slot and/or the OFDM symbol.

In some examples, the one or more actions comprises the UE discarding and/or ignoring the SFI.

In some examples, the one or more actions comprises the UE storing and/or buffering the SFI until one or more of next SFI monitoring occasion (e.g., a next available monitoring occasion), the UE receiving a channel indicator, the UE receiving an indication of a channel occupancy (after the COT and/or the time period), and/or the UE being indicated of a channel occupancy (after the COT and/or the time period).

In some examples, the one or more actions comprises the UE applying the SFI from (a time during) a second slot and/or a second OFDM symbol, wherein the UE detects a channel occupancy (after the COT and/or the time period) for the serving cell in the second slot and/or the second OFDM symbol.

In some examples, the one or more actions comprises the UE applying the SFI from (a time during) a second slot and/or a second OFDM symbol, wherein the UE receives (from a network) a channel indicator (after the COT and/or the time period) for the serving cell in the second slot and/or the second OFDM symbol.

In some examples, the one or more actions comprises the UE applying the SFI responsive to receiving and/or detecting a channel indicator.

In some examples, the one or more actions comprises the UE not applying the SFI if the UE does not receive and/or does not detect a channel indicator. In some examples, the UE performing the one or more actions comprises the UE not applying the SFI, after the COT, until the UE receives and/or detects a channel indicator.

In some examples, the one or more actions comprises the UE applying the SFI responsive to receiving and/or detecting a channel indicator, wherein the channel indicator indicates the SFI is available.

In some examples, the one or more actions comprises the UE applying the SFI responsive to receiving and/or detecting a channel indicator after receiving the SFI, wherein the channel indicator indicates the SFI is available.

In some examples, the one or more actions comprises the UE not applying the SFI responsive to receiving and/or detecting a channel indicator, wherein the channel indicator indicates the SFI is not available.

In some examples, the one or more actions comprises the UE not applying the SFI responsive to receiving and/or detecting a channel indicator after receiving the SFI, wherein the channel indicator indicates the SFI is not available.

In some examples, the COT is obtained by a network. In some examples, the COT is obtained by the UE.

In some examples, a channel indicator is indicative of a beginning of a COT of a network (e.g., the channel indicator indicates starting of the COT of a network).

In some examples, the UE may determine (and/or consider and/or assume) that a COT of a network starts at an OFDM symbol where the channel indicator is received.

In some examples, if and/or after the UE detects and/or receives a channel indicator, the UE determines and/or considers that a COT of the network started (and/or is starting).

In some examples, a channel occupancy corresponds to a wireless node performing transmission in an unlicensed spectrum and/or an unlicensed channel for a time period after successful performance of a channel access procedure and/or an LBT scheme. In some examples, the time period corresponds to a COT where the wireless node is able to perform one or more transmissions (continuously). In some examples, the wireless node may perform, within the COT, one or more transmissions without performing a second channel access procedure and/or a second LBT scheme.

In some examples, a UE detecting a channel occupancy and/or a COT corresponds to the UE determining that a network and/or the UE are (currently) able to perform one or more transmissions (continuously) for a time period (e.g., the COT) after successful performance of a channel access procedure and/or an LBT scheme.

In some examples, a channel occupancy corresponds to a wireless node performing transmission in an unlicensed spectrum and/or an unlicensed channel for a time period after successful performance of a channel access procedure and/or an LBT scheme. In some examples, the time period corresponds to a COT where the wireless node is able to perform one or more transmissions (continuously). In some examples, the wireless node may perform, within the COT, one or more transmissions without performing a second channel access procedure and/or a second LBT scheme.

In some examples, an SFI is indicative of a slot combination for a serving cell. In some examples, a slot combination comprises one or more slot format values. In some examples, a slot format value is indicative of a slot format of a slot. In some examples, a slot format value is indicative of a transmission direction and/or a functionality of an OFDM symbol in a slot. In some examples, a slot format value is indicative of a transmission direction and/or a functionality of each OFDM symbol of a plurality of OFDM symbols in a slot. In some examples, an SFI is indicated by a DCI (e.g., an SFI related DCI). In some examples, the DCI is a DCI format 2_0.

Figure 11:
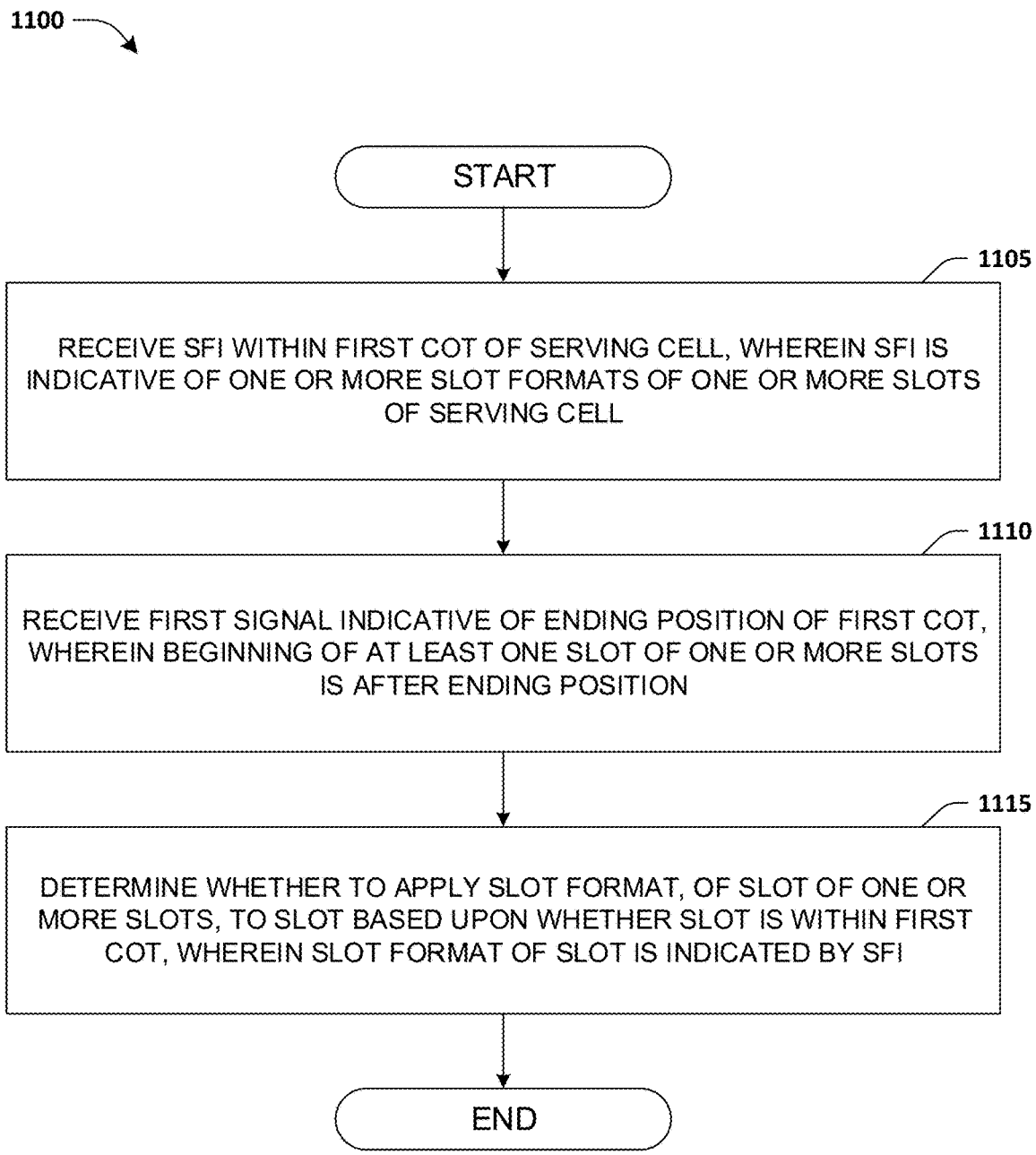
FIG. 11 is a flow chart according to one exemplary embodiment.

FIG. 11 is a flow chart 1100 according to one exemplary embodiment from the perspective of a UE. In step 1105, the UE receives an SFI within a first COT of a serving cell, wherein the SFI is indicative of one or more slot formats of one or more slots of the serving cell. In step 1110, the UE receives a first signal indicative of an ending position of the first COT, wherein a beginning of at least one slot of the one or more slots is after the ending position (e.g., a time corresponding to the beginning of the at least one slot is after a time corresponding to the ending position). In step 1115, the UE determines whether to apply a slot format, of a slot of the one or more slots, to the slot based upon whether the slot is within the first COT (and/or based upon whether the slot is completely within the first COT), wherein the slot format of the slot is indicated by the SFI.

Referring back to FIGS. 3 and 4, in one exemplary embodiment of a UE, the device 300 includes a program code 312 stored in the memory 310. The CPU 308 may execute program code 312 to enable the UE (i) to receive an SFI within a first COT of a serving cell, wherein the SFI is indicative of one or more slot formats of one or more slots of the serving cell, (ii) to receive a first signal indicative of an ending position of the first COT, wherein a beginning of at least one slot of the one or more slots is after the ending position, and (iii) to determine whether to apply a slot format, of a slot of the one or more slots, to the slot based upon whether the slot is within the first COT (and/or based upon whether the slot is completely within the first COT), wherein the slot format of the slot is indicated by the SFI. Furthermore, the CPU 308 can execute the program code 312 to perform some and/or all of the above-described actions and steps and/or others described herein.

In the context of the embodiments illustrated in FIG. 11, and discussed above, the UE may apply a slot format, of the slot, to the slot responsive to a determination that the slot is within the first COT (and/or responsive to a determination that the slot is completely within the first COT), wherein the slot format of the slot is indicated by the SFI.

In some examples, the UE may apply a slot format, of a portion of the slot, to the portion of the slot responsive to a determination that the portion of the slot is within the first COT (and/or responsive to a determination that the portion of the slot is completely within the first COT), wherein the slot format is indicated by the SFI. Alternatively and/or additionally, the UE may apply a partial slot format of a slot to a portion of the slot responsive to a determination that the portion of the slot is within the first COT, wherein the partial slot format of the slot corresponds to the portion of the slot and/or the partial slot format of the slot is indicated by the SFI.

In some examples, the UE may not apply and/or may discard a slot format of a portion of the slot if the portion of the slot is outside the first COT (and/or if the portion of the slot is completely outside the first COT) and/or if the portion of the slot is not within (and/or does not overlap with) a COT (e.g., any COT) of the serving cell. Alternatively and/or additionally, the UE may discard a partial slot format of the slot and/or may not apply the partial slot format of the slot to a portion of the slot responsive to a determination that the portion of the slot is outside the first COT and/or a determination that the portion of the slot is not within a COT of the serving cell, wherein the partial slot format of the slot corresponds to the portion of the slot and/or the partial slot format of the slot is indicated by the SFI.

In some examples, the UE may derive a slot format of a portion of the slot based upon a semi-static slot structure if the portion of the slot is outside the first COT, if the portion of the slot is not within (and/or does not overlap with) a COT (e.g., any COT) of the serving cell and/or if the portion of the slot is within a second COT of the serving cell, wherein the second COT is after the first COT.

In some examples, the UE may not apply and/or may discard a slot format of the slot if the slot is outside the first COT (and/or if the slot is completely outside the first COT) and/or if the slot is not within (and/or does not overlap with) a COT (e.g., any COT) of the serving cell, wherein the slot format of the slot is indicated by the SFI.

In some examples, the UE may derive a slot format of the slot based upon a semi-static slot structure responsive to a determination that the slot is outside the first COT, a determination that the slot is not within (and/or does not overlap with) a COT (e.g., any COT) of the serving cell and/or a determination that the slot is within a second COT of the serving cell, wherein the second COT is after the first COT.

In some examples, the UE may not receive a second SFI (and/or any SFI) for the serving cell between a time corresponding to reception of the SFI and a time corresponding to the slot. In some examples, the time corresponding to reception of the SFI corresponds to a time after and/or during reception of the SFI by the UE. In some examples, the time corresponding to the slot corresponds to a time before and/or within the slot.

In some examples, if a slot format of the slot is discarded and/or not applied, the UE may determine (and/or consider and/or assume) that a slot format, a transmission direction, a functionality and/or a state of one or more OFDM symbols of the slot are flexible, wherein the slot format of the slot is indicated by the SFI.

In some examples, responsive to discarding and/or not applying a slot format of the slot, the UE may perform detection and/or sensing (and/or monitoring) of a second signal indicative of a second COT of the serving cell, wherein the slot format of the slot is indicated by the SFI. For example, the UE may perform detection and/or sensing (and/or monitoring) of the second signal and/or the UE may receive the second signal within and/or after the slot.

In some examples, responsive to discarding and/or not applying a slot format of the slot, the UE may not perform reception of a configured physical channel and/or a reference signal, wherein the slot format of the slot is indicated by the SFI.

In some examples, responsive to discarding and/or not applying a slot format of the slot, the UE may not perform transmission of a configured physical channel and/or a reference signal, wherein the slot format of the slot is indicated by the SFI.

It may be appreciated that applying one or more of the techniques presented herein may result in one or more benefits including, but not limited to, increasing an operating efficiency of a UE as a result of the UE not performing data reception and/or data transmission in one or more slots outside a COT (e.g., any COT) if the UE receives an SFI, associated with a serving cell, indicative of one or more slot formats of the one or more slots outside a channel occupancy (e.g., any channel occupancy) and/or a COT (e.g., any COT) associated with the serving cell.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 10-11. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
   determining whether a slot of a serving cell is within a first Channel Occupancy Time (COT) of the serving cell; and
   determining whether to apply a slot format to the slot of the serving cell based upon the determination of whether the slot is within the first COT of the serving cell, wherein an indication of the slot format is received within the first COT.

2. The method of claim 1, comprising:
   applying a slot format of a slot to the slot responsive to a determination that the slot is within the first COT, wherein the slot format is indicated by the indication.

3. The method of claim 1, comprising:
   applying a partial slot format of a slot to a portion of the slot responsive to a determination that the portion of the slot is within the first COT, wherein the partial slot format of the slot corresponds to the portion of the slot and the partial slot format of the slot is indicated by the indication.

4. The method of claim 1, comprising:
   at least one of discarding a partial slot format of a slot or not applying the partial slot format of the slot to a portion of the slot responsive to at least one of:
   a determination that the portion of the slot is outside the first COT; or
   a determination that the portion of the slot is not within a COT of the serving cell, wherein the partial slot format of the slot corresponds to the portion of the slot and the partial slot format of the slot is indicated by the indication.

5. The method of claim 1, comprising:
   deriving a slot format of a portion of the slot based upon at least a semi-static slot structure responsive to at least one of:
   a determination that the portion of the slot is outside the first COT;
   a determination that the portion of the slot is not within a COT of the serving cell; or
   a determination that the portion of the slot is within a second COT of the serving cell, wherein the second COT is after the first COT.

6. The method of claim 1, comprising:
   at least one of discarding or not applying a slot format of the slot responsive to at least one of:
   a determination that the slot is outside the first COT; or
   a determination that the slot is not within a COT of the serving cell, wherein the slot format of the slot is indicated by the indication.

7. The method of claim 1, comprising:
   deriving a slot format of the slot based upon at least a semi-static slot structure responsive to at least one of:
   a determination that the slot is outside the first COT;
   a determination that the slot is not within a COT of the serving cell; or
   a determination that the slot is within a second COT of the serving cell, wherein the second COT is after the first COT.

8. The method of claim 1, wherein the UE does not receive a second indication for the serving cell between a time corresponding to reception of the indication and a time corresponding to a symbol of the slot.

9. The method of claim 1, comprising:
determining that at least one of a slot format, a transmission direction or a functionality of one or more orthogonal frequency-division multiplexing (OFDM) symbols of the slot are flexible if a slot format of the slot is at least one of discarded or not applied, wherein the slot format of the slot is indicated by the indication.

10. The method of claim 1, comprising:
responsive to at least one of discarding or not applying a slot format of the slot:
not performing reception of at least one of a configured physical channel or a reference signal, wherein the slot format of the slot is indicated by the indication.

11. A communication device, comprising:
a processor; and
memory comprising processor-executable instructions that when executed by the processor cause performance of operations, the operations comprising:
determining whether a slot of a serving cell is within a first Channel Occupancy Time (COT) of the serving cell; and
determining whether to apply a slot format to the slot of the serving cell based upon the determination of whether the slot is within the first COT of the serving cell, wherein an indication of the slot format is received within the first COT.

12. The communication device of claim 11, the operations comprising:
applying a slot format of a slot to the slot responsive to a determination that the slot is within the first COT, wherein the slot format is indicated by the indication.

13. The communication device of claim 11, the operations comprising:
applying a partial slot format of a slot to a portion of the slot responsive to a determination that the portion of the slot is within the first COT, wherein the partial slot format of the slot corresponds to the portion of the slot and the partial slot format of the slot is indicated by the indication.

14. The communication device of claim 11, the operations comprising:
at least one of discarding a partial slot format of a slot or not applying the partial slot format of the slot to a portion of the slot responsive to at least one of:
a determination that the portion of the slot is outside the first COT; or
a determination that the portion of the slot is not within a COT of the serving cell, wherein the partial slot format of the slot corresponds to the portion of the slot and the partial slot format of the slot is indicated by the indication.

15. The communication device of claim 11, the operations comprising:
deriving a slot format of a portion of the slot based upon at least a semi-static slot structure responsive to at least one of:
a determination that the portion of the slot is outside the first COT;
a determination that the portion of the slot is not within a COT of the serving cell; or
a determination that the portion of the slot is within a second COT of the serving cell, wherein the second COT is after the first COT.

16. The communication device of claim 11, the operations comprising:
at least one of discarding or not applying a slot format of the slot responsive to at least one of:
a determination that the slot is outside the first COT; or
a determination that the slot is not within a COT of the serving cell, wherein the slot format of the slot is indicated by the indication.

17. The communication device of claim 11, the operations comprising:
deriving a slot format of the slot based upon at least a semi-static slot structure responsive to at least one of:
a determination that the slot is outside the first COT;
a determination that the slot is not within a COT of the serving cell; or
a determination that the slot is within a second COT of the serving cell, wherein the second COT is after the first COT.

18. The communication device of claim 11, wherein the communication device does not receive a second indication for the serving cell between a time corresponding to reception of the indication and a time corresponding to a symbol of the slot.

19. The communication device of claim 11, the operations comprising:
determining that at least one of a slot format, a transmission direction or a functionality of one or more orthogonal frequency-division multiplexing (OFDM) symbols of the slot are flexible if a slot format of the slot is at least one of discarded or not applied, wherein the slot format of the slot is indicated by the indication.

20. A method of a User Equipment (UE), comprising:
applying a slot format, of a first slot of a serving cell, to the first slot, wherein the first slot is within a first Channel Occupancy Time (COT) of the serving cell, and an indication of the slot format of the first slot is received within the first COT; and
not performing reception of at least one of a configured physical channel or a reference signal on a second slot if the second slot is outside the first COT, wherein an indication of a second slot format of the second slot is received within the first COT.

* * * * *